US012705561B2

(12) United States Patent
Al-Temyatt

(10) Patent No.: US 12,705,561 B2
(45) Date of Patent: Aug. 11, 2026

(54) SYSTEMS AND METHODS FOR MODIFYING HYDROCARBON SUPPLY CHAINS BASED ON PREDICTED HYDROCARBON SUPPLY CHAIN RISK

(71) Applicant: Saudi Arabian Oil Company, Dhahran (SA)

(72) Inventor: Saud Al-Temyatt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 263 days.

(21) Appl. No.: 18/358,683

(22) Filed: Jul. 25, 2023

(65) Prior Publication Data

US 2025/0037055 A1 Jan. 30, 2025

(51) Int. Cl.
*G06Q 10/00* (2026.01)
*G06Q 10/0635* (2023.01)
*G06Q 10/087* (2023.01)

(52) U.S. Cl.
CPC ....... *G06Q 10/0635* (2013.01); *G06Q 10/087* (2013.01)

(58) Field of Classification Search
None
See application file for complete search history.

(56) References Cited

U.S. PATENT DOCUMENTS 7,246,080 B2 * 7/2007 Feldman .............. G06Q 10/087 705/7.28
11,429,927 B1 * 8/2022 Melancon ............ G06Q 10/087
(Continued)

FOREIGN PATENT DOCUMENTS

CN 103824163 A 5/2014
WO 2022133330 A1 6/2022
(Continued)

OTHER PUBLICATIONS

K Tong, Y Feng, G Rong et al. (Planning under demand and yield uncertainties in an oil supply chain)—Industrial & engineering chemistry . . . , 2012—ACS Publications. (Year: 2012).*
(Continued)

*Primary Examiner* — Hafiz A Kassim
(74) *Attorney, Agent, or Firm* — Dinsmore & Shohl LLP

(57) ABSTRACT

A system for hydrocarbon supply chain modification based on predicted hydrocarbon supply chain risk includes a hydrocarbon supply chain network element monitoring system; hydrocarbon supply chain modification hardware; a hydrocarbon supply chain data memory; a hydrocarbon supply chain risk prediction output translator; and a hydrocarbon supply chain risk predictor configured to cause the system to perform the following: identify a hydrocarbon supply chain for hydrocarbon supply chain risk prediction; receive a plurality of hydrocarbon supply chain variables for the hydrocarbon supply chain; identify a limiting factor of an affected hydrocarbon supply chain network element; predict an estimated lower supply bound and an estimated upper demand bound; determine whether the estimated lower supply bound meets or exceeds the estimated upper demand bound; generate a risk profile; generate a hydrocarbon supply chain risk mitigation levers; and implement the hydrocarbon supply chain risk mitigation lever.

20 Claims, 4 Drawing Sheets

(56) References Cited

U.S. PATENT DOCUMENTS

| | | | | |
|---|---|---|---|---|
| 12,147,925 | B1 * | 11/2024 | R | G06Q 10/0635 |
| 2007/0016542 | A1 * | 1/2007 | Rosauer | G06Q 10/067 706/21 |
| 2008/0189158 | A1 * | 8/2008 | Bala | G06Q 10/0635 706/12 |
| 2008/0234939 | A1 * | 9/2008 | Foot | E21B 47/06 702/12 |
| 2009/0177505 | A1 | 7/2009 | Dietrich et al. | |
| 2011/0119114 | A1 | 5/2011 | Singh et al. | |
| 2012/0221485 | A1 * | 8/2012 | Leidner | G06Q 40/08 705/36 R |
| 2013/0060598 | A1 * | 3/2013 | Dudley | G06Q 10/08 705/7.28 |
| 2014/0172382 | A1 * | 6/2014 | Andrews | F17D 5/00 703/2 |
| 2014/0278728 | A1 * | 9/2014 | Hollenbach | G06Q 10/0635 705/7.28 |
| 2015/0051940 | A1 | 2/2015 | Bhowmik et al. | |
| 2015/0120373 | A1 * | 4/2015 | Bajaj | G06Q 10/0635 705/7.25 |
| 2016/0217406 | A1 * | 7/2016 | Najmi | G06Q 10/06315 |
| 2016/0342922 | A1 * | 11/2016 | Mccarthy | G05B 13/021 |
| 2016/0373478 | A1 * | 12/2016 | Doubleday | G06F 8/65 |
| 2018/0197128 | A1 * | 7/2018 | Carstens | G06F 16/9024 |
| 2019/0180210 | A1 * | 6/2019 | Dingerdissen | G06Q 10/067 |
| 2020/0057981 | A1 * | 2/2020 | Partin | G06F 17/16 |
| 2021/0133670 | A1 | 5/2021 | Cella et al. | |
| 2021/0157947 | A1 | 5/2021 | Biazetti et al. | |
| 2021/0224669 | A1 * | 7/2021 | Chung | E21B 49/087 |
| 2022/0107618 | A1 | 4/2022 | Schoeneboom et al. | |
| 2022/0138655 | A1 | 5/2022 | Kinai et al. | |
| 2022/0187847 | A1 | 6/2022 | Cella et al. | |
| 2022/0245574 | A1 | 8/2022 | Cella et al. | |

FOREIGN PATENT DOCUMENTS

| | | | |
|---|---|---|---|
| WO | 2022221719 | A2 | 10/2022 |
| WO | 2022240906 | A1 | 11/2022 |

OTHER PUBLICATIONS

Ronza et al., "A Quantitative Risk Analysis Approach to Port Hydrocarbon Logistics," Journal of Hazardous Materials, Elsevier, vol. 128, No. 1, Jan. 16, 2006, pp. 10-24. (Year: 2006).*

Kshetri, "Blockchain's Roles in Meeting Key Supply Chain Management Objectives", International Journal of Information Management 39, pp. 80-89, 2018.

Notification of Transmittal of the International Search Report and the Written Opinion of the International Searching Authority, or the Declaration dated Nov. 8, 2024 pertaining to International application No. PCT/US2024/038279 filed Jul. 17, 2024, pp. 1-12.

Silva, L M F et al. "Risk assessment model using conditional probability and simulation: case study in a piped gas supply chain in Brazil" International Journal of Production Research, Taylor & Francis UK, vol. 59, No. 10, 2021, pp. 2960-2976.

* cited by examiner

SYSTEMS AND METHODS FOR MODIFYING HYDROCARBON SUPPLY CHAINS BASED ON PREDICTED HYDROCARBON SUPPLY CHAIN RISK

TECHNICAL FIELD

Embodiments described herein generally relate to systems and methods for supply chain modification in the context of hydrocarbon supply chains in the oil and gas industries, and specifically to computing systems that receive vast amounts of data associated with a supply chain and utilize that data to predict risks from incongruences in the predicted supply constraints and predicted demand of that product and to modify the supply chain in response to the predicted risks.

BACKGROUND

The global supply chain refers to an international organization of producers, transporters, and sellers that collectively extract raw materials, process those raw materials into consumer products, transport the consumer products, and distribute the consumer products to consumers. While the supply chain has evolved organically via supply and demand of the various entities that produce those products, many recent events have illustrated that disruption in the supply chain can be catastrophic to the global economy. Disruption in the supply chain may take the form of reduced supply of raw materials, reduced supply of labor, reduced supply of processing capability, reduced supply of transportation, increased demand for the products, etc. Based on these recent events, it is clear that even small disruptions to the supply chain, and specifically to the inability for the supply chain to produce and deliver enough products to meet demand, can cause global inflation, global recession, and/or other global events.

As an example, the oil and gas industry is very important to the global economy, not to mention consumer well-being. Disruptions in hydrocarbon supply chains of oil and gas companies can affect those companies' abilities to meet global demand and thereby cause negative effects to many, if not all other industries. As such, there is a need to move away from single, isolated solutions for hydrocarbon supply chain resilience and flexibility and to move toward end-to-end (E2E) system solutions, to quickly, and incorporating data spanning end-to-end across a hydrocarbon supply chain, predict hydrocarbon supply chain risks and provide solutions for modifying the hydrocarbon supply chain to reduce such hydrocarbon supply chain risks.

SUMMARY

According to a first aspect A1, a method for modifying a hydrocarbon supply chain based on predicted hydrocarbon supply chain risk comprises: identifying, by a hydrocarbon supply chain risk predictor, a hydrocarbon supply chain for hydrocarbon supply chain risk prediction, wherein the hydrocarbon supply chain includes a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receiving, by a hydrocarbon supply chain data memory from a hydrocarbon supply chain network monitoring system, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that each affect at least one hydrocarbon supply chain network element of the plurality of hydrocarbon supply chain network elements; in response to determining a change to at least one of the hydrocarbon supply chain network element variables, identifying, by the hydrocarbon supply chain risk predictor and using at least one of the hydrocarbon supply chain network element variables, a first limiting factor of an affected hydrocarbon supply chain network element; predicting, by the hydrocarbon supply chain risk predictor and using the first limiting factor, a first estimated lower supply bound and a first estimated upper demand bound corresponding to the affected hydrocarbon supply chain network element; determining, by the hydrocarbon supply chain risk predictor, whether the first estimated lower supply bound meets or exceeds the first estimated upper demand bound; in response to determining that the first estimated upper demand bound exceeds the estimated lower supply bound, generating, by the hydrocarbon supply chain risk predictor, a risk profile corresponding to the affected hydrocarbon supply chain network element; generating, by the hydrocarbon supply chain risk predictor and using the risk profile, one or more hydrocarbon supply chain risk mitigation levers; and implementing at least one of the hydrocarbon supply chain risk mitigation levers using a hydrocarbon supply chain risk prediction output translator, hydrocarbon supply chain modification hardware, or both.

A second aspect A2 includes the method according to the first aspect A1, wherein the first limiting factor includes a supply limiting factor and a demand limiting factor; the first estimated lower supply bound is calculated using the supply limiting factor; and the first estimated upper demand bound is calculated using the demand limiting factor.

A third aspect A3 includes the method according to the second aspect A2, wherein receiving the plurality of hydrocarbon supply chain variables includes receiving at least one of the following supply variables: material data, material inventory data, purchase orders data for raw materials, transportation data, warehouse data, material consumption data, production planning data, production infrastructure data, or supplier data.

A fourth aspect A4 includes the method according to the second aspect A2 or the third aspect A3, wherein receiving the plurality of hydrocarbon supply chain variables includes receiving at least one of the following demand variables: historical sales data, consumer price index data, purchase order data, stock keeping unit data, market data, production infrastructure data, or material consumption data.

A fifth aspect A5 includes the method according to any of the aspects A1-A4, wherein the method further comprises: identifying, by the hydrocarbon supply chain risk predictor and using at least one of the hydrocarbon supply chain network element variables, a second limiting factor of the affected hydrocarbon supply chain network element; predicting, by the hydrocarbon supply chain risk predictor and using the second limiting factor, a second estimated lower supply bound and a second estimated upper demand bound corresponding to the affected hydrocarbon supply chain network element; determining, by the hydrocarbon supply chain risk predictor, whether the second estimated lower supply bound meets or exceeds the second estimated upper demand bound; and in response to determining that the second estimated upper demand bound does not exceed the second estimated lower supply bound, generating, by the hydrocarbon supply chain risk predictor, the risk profile corresponding to the affected network element.

A sixth aspect A6 includes the method according to the fifth aspect A5, wherein the hydrocarbon supply chain risk mitigation levers include at least one of the following: submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, and/or used in the hydrocarbon supply chain.

A seventh aspect A7 includes the method according to any of the aspects A1-A6, wherein the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

An eighth aspect A8 includes the method according to any of the aspects A1-A7, wherein the method further comprises, in response to determining that the first estimated upper demand bound does not exceed the first estimated lower supply bound, determining that there is no supply chain risk.

A ninth aspect A9 includes the method according to any of the aspects A1-A8, wherein generating the risk profile includes generating a risk visualization.

A tenth aspect A10 includes the method according to the ninth aspect A9, wherein the risk visualization includes a risk alert that corresponds to a predetermined risk category of the supply chain.

An eleventh aspect A11 includes the method according to the ninth aspect A9, wherein the risk visualization includes at least one of the following: purchase orders data; historical data; projections of the product supply chain; a risk alert; and a risk mitigation lever.

A twelfth aspect A12 includes the method according to any of the aspects A1-A11, wherein the risk profile includes information indicating at least one of the following: a nature of the risk profile, a probability of a negative consequence of the risk profile manifesting, or a severity of the negative consequence of the risk profile manifesting.

According to a thirteenth aspect B1, a system for hydrocarbon supply chain modification based on predicted hydrocarbon supply chain risk comprises: a hydrocarbon supply chain network element monitoring system; hydrocarbon supply chain modification hardware; a hydrocarbon supply chain data memory; a hydrocarbon supply chain risk prediction output translator; and a hydrocarbon supply chain risk predictor configured to cause the system to perform at least the following: identify a hydrocarbon supply chain for hydrocarbon supply chain risk prediction, wherein the hydrocarbon supply chain includes a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receive, by the hydrocarbon supply chain data memory from the hydrocarbon supply chain network element monitoring system, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that affect at least one hydrocarbon supply chain network element of the plurality of hydrocarbon supply chain network elements; in response to determining a change to at least one of the hydrocarbon supply chain network element variables, identify, using at least one of the hydrocarbon supply chain network element variables, a limiting factor of an affected hydrocarbon supply chain network element; predict, using the limiting factor, an estimated lower supply bound and an estimated upper demand bound corresponding to the affected hydrocarbon supply chain network element; determine whether the estimated lower supply bound meets or exceeds the estimated upper demand bound; in response to determining that the estimated upper demand bound exceeds the estimated lower supply bound, generate a risk profile corresponding to the affected hydrocarbon supply chain network element; generate, using the risk profile, one or more hydrocarbon supply chain risk mitigation levers; and implement at least one of the hydrocarbon supply chain risk mitigation levers using the hydrocarbon supply chain risk prediction output translator, the hydrocarbon supply chain modification hardware, or both.

A fourteenth aspect B2 includes the system according to the thirteenth aspect B1, wherein the first limiting factor includes a supply limiting factor and a demand limiting factor; the first estimated lower supply bound is calculated using the supply limiting factor; and the first estimated upper demand bound is calculated using the demand limiting factor.

A fifteenth aspect B3 includes the system according to the fourteenth aspect B2, wherein receiving the plurality of hydrocarbon supply chain variables includes receiving at least one of the following supply variables: material data, material inventory data, purchase orders data for raw materials, transportation data, warehouse data, material consumption data, production planning data, production infrastructure data, or supplier data.

A sixteenth aspect B4 includes the system according to the fourteenth aspect B2 or the fifteenth aspect A3, wherein receiving the plurality of hydrocarbon supply chain variables includes receiving at least one of the following demand variables: historical sales data, consumer price index data, purchase order data, stock keeping unit data, market data, production infrastructure data, or material consumption data.

A seventeenth aspect B5 includes the system according to any of the aspects B1-B4, wherein the hydrocarbon supply chain risk predictor is configured to further cause the system to perform: identify, using at least one of the hydrocarbon supply chain network element variables, a second limiting factor of the affected hydrocarbon supply chain network element; predict, using the second limiting factor, a second estimated lower supply bound and a second estimated upper demand bound corresponding to the affected hydrocarbon supply chain network element; determine whether the second estimated lower supply bound meets or exceeds the second estimated upper demand bound; and in response to determining that the second estimated upper demand bound does not exceed the second estimated lower supply bound, generate the risk profile corresponding to the affected hydrocarbon supply chain network element.

An eighteenth aspect B6 includes the system according to the seventeenth aspect B5, wherein the hydrocarbon supply chain risk mitigation levers include at least one of the following: submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, or used in the hydrocarbon supply chain.

A nineteenth aspect B7 includes the system according to any of the aspects B1-B6, wherein the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

A twentieth aspect B8 includes the system according to any of the aspects B1-B7, wherein the hydrocarbon supply chain risk predictor, when executed by the processor, further causes the system to perform: in response to determining that the first estimated upper demand bound does not exceed the first estimated lower supply bound, determine that there is no supply chain risk.

A twenty-first aspect B9 includes the system according to any of the aspects B1-B8, wherein generating the risk profile includes generating a risk visualization.

A twenty-second aspect B10 includes the system according to the twenty-first aspect B9, wherein the risk visualization includes a risk alert that corresponds to a predetermined risk category of the hydrocarbon supply chain.

An twenty-third aspect B11 includes the system according to the twenty-first aspect B9, wherein the risk visualization includes at least one of the following: purchase orders data; historical data; projections of the product supply chain; a risk alert; and a risk mitigation lever.

A twenty-fourth aspect B12 includes the system according to any of the aspects B1-B11, wherein the risk profile includes information indicating at least one of the following: a nature of the risk profile, a probability of a negative consequence of the risk profile manifesting, or a severity of the negative consequence of the risk profile manifesting.

According to a twenty-fifth aspect C1, a non-transitory computer-readable medium stores logic that, when executed by a hydrocarbon supply chain risk predictor, causes the hydrocarbon supply chain risk predictor to perform at least the following: identify a hydrocarbon supply chain for hydrocarbon supply chain risk prediction, wherein the hydrocarbon supply chain includes a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process; receive, by a hydrocarbon supply chain data memory from a hydrocarbon supply chain network element monitoring system, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that affect at least one hydrocarbon supply chain network element of the plurality of hydrocarbon supply chain network elements; in response to determining a change to at least one of the hydrocarbon supply chain network element variables, identify, using at least one of the hydrocarbon supply chain network element variables, a limiting factor of an affected hydrocarbon supply chain network element; predict, using the limiting factor, an estimated lower supply bound and an estimated upper demand bound corresponding to the affected hydrocarbon supply chain network element; determine whether the estimated lower supply bound meets or exceeds the estimated upper demand bound; in response to determining that the estimated upper demand bound exceeds the estimated lower supply bound, generate a risk profile corresponding to the affected hydrocarbon supply chain network element; generate, using the risk profile, one or more hydrocarbon supply chain risk mitigation levers; and implement at least one of the hydrocarbon supply chain risk mitigation levers using a hydrocarbon supply chain risk prediction output translator, hydrocarbon supply chain modification hardware, or both.

A twenty-sixth aspect C2 includes the non-transitory computer-readable medium according to the twenty-fifth aspect C1, wherein the first limiting factor includes a supply limiting factor and a demand limiting factor; the first estimated lower supply bound is calculated using the supply limiting factor; and the first estimated upper demand bound is calculated using the demand limiting factor.

A twenty-seventh aspect C3 includes the non-transitory computer-readable medium according to the twenty-sixth aspect C2, wherein receiving the plurality of hydrocarbon supply chain variables includes receiving at least one of the following supply variables: material data, material inventory data, purchase orders data for raw materials, transportation data, warehouse data, material consumption data, production planning data, production infrastructure data, or supplier data.

A twenty-eighth aspect C4 includes the non-transitory computer-readable medium according to the twenty-sixth aspect C2 or the twenty-seventh aspect C3, wherein receiving the plurality of hydrocarbon supply chain variables includes receiving at least one of the following demand variables: historical sales data, consumer price index data, purchase order data, stock keeping unit data, market data, production infrastructure data, or material consumption data.

A twenty-ninth aspect C5 includes the non-transitory computer-readable medium according to any of the aspects C1-C4, wherein the logic, when executed by the hydrocarbon supply chain risk predictor, further causes the hydrocarbon supply chain risk predictor to perform: identify, using at least one of the hydrocarbon supply chain network element variables, a second limiting factor of the affected hydrocarbon supply chain network element; predict, using the second limiting factor, a second estimated lower supply bound and a second estimated upper demand bound corresponding to the affected hydrocarbon supply chain network element; determine whether the second estimated lower supply bound meets or exceeds the second estimated upper demand bound; and in response to determining that the second estimated upper demand bound does not exceed the second estimated lower supply bound, generate the risk profile corresponding to the affected network element.

An thirtieth aspect C6 includes the non-transitory computer-readable medium according to the twenty-ninth aspect C5, wherein the hydrocarbon supply chain risk mitigation levers include at least one of the following: submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, and/or used in the hydrocarbon supply chain.

A thirty-first aspect C7 includes the non-transitory computer-readable medium according to any of the aspects C1-C6, wherein the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

A thirty-second aspect C8 includes the non-transitory computer-readable medium according to any of the aspects C1-C7, wherein the logic, when executed by the hydrocarbon supply chain risk predictor, further causes the hydrocarbon supply chain risk predictor to perform: in response to determining that the first estimated upper demand bound does not exceed the first estimated lower supply bound, determine that there is no supply chain risk.

A thirty-third aspect C9 includes the non-transitory computer-readable medium according to any of the aspects C1-C8, wherein generating the risk profile includes generating a risk visualization.

A thirty-fourth aspect C10 includes the non-transitory computer-readable medium according to the thirty-third aspect C9, wherein the risk visualization includes a risk alert that corresponds to a predetermined risk category of the hydrocarbon supply chain.

An thirty-fifth aspect C11 includes the non-transitory computer-readable medium according to the thirty-third aspect C9, wherein the risk visualization includes at least one of the following: purchase orders data; historical data; projections of the product supply chain; a risk alert; and a risk mitigation lever.

A thirty-sixth aspect C12 includes the non-transitory computer-readable medium according to any of the aspects C1-C11, wherein the risk profile includes information indicating at least one of the following: a nature of the risk profile, a probability of a negative consequence of the risk profile manifesting, or a severity of the negative consequence of the risk profile manifesting.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for predicting supply chain demand risk. In some embodiments, artificial intelligence (AI) and various modeling methods may use a data set collected from multiple sources end-to-end across a supply chain to visualize, predict, and provide decision support for supply chain risk.

In some embodiments, data sets may be combined from a plurality of sources (e.g., demand planning, procurement, suppliers, inventory, warehousing, logistics, etc.) to simulate risk and inventory levels in advance, including risks such as forecast and consumption risk and purchase order arrival risk due to supplier disruption. In some embodiments, procurement teams may be provided with decision-making support to accurately set purchase order requirements (i.e., volume and timing), and certain embodiments may further suggest mitigation actions to manage risk, such as by calculating net requirement predictions at a granular level and over time and by assessing combined risk to future inventory levels to suggest optimal mitigation actions. Embodiments described herein may thereby optimize the volume-planning of materials, address under-stocking and over-stocking of materials, and reduce last-minute actions such as air-freight and emergency purchase orders.

In some embodiments, supply chain demand risk may be predicted in the context of a broader "digital twin" of part or all of the supply chain for which demand risk is predicted. A digital twin may be a digital representation or recreation (e.g., a visualization or other interface) of a real-world system (e.g., a supply chain) which may be used for compiling large amounts of data (e.g., data spanning end-to-end across a supply chain), representing that data to a user in a single interface, and simulating further changes to the data based on, e.g., proposed modifications input by a user or forecasted changes in supply chain data. As will be described in further detail below, a system or method for predicting supply chain demand risk may be implemented within a digital twin to both access supply chain data for demand risk prediction and to integrate predicted demand risks and associated risk mitigation levers into an interface or visualization of the digital twin.

Figure 1A:
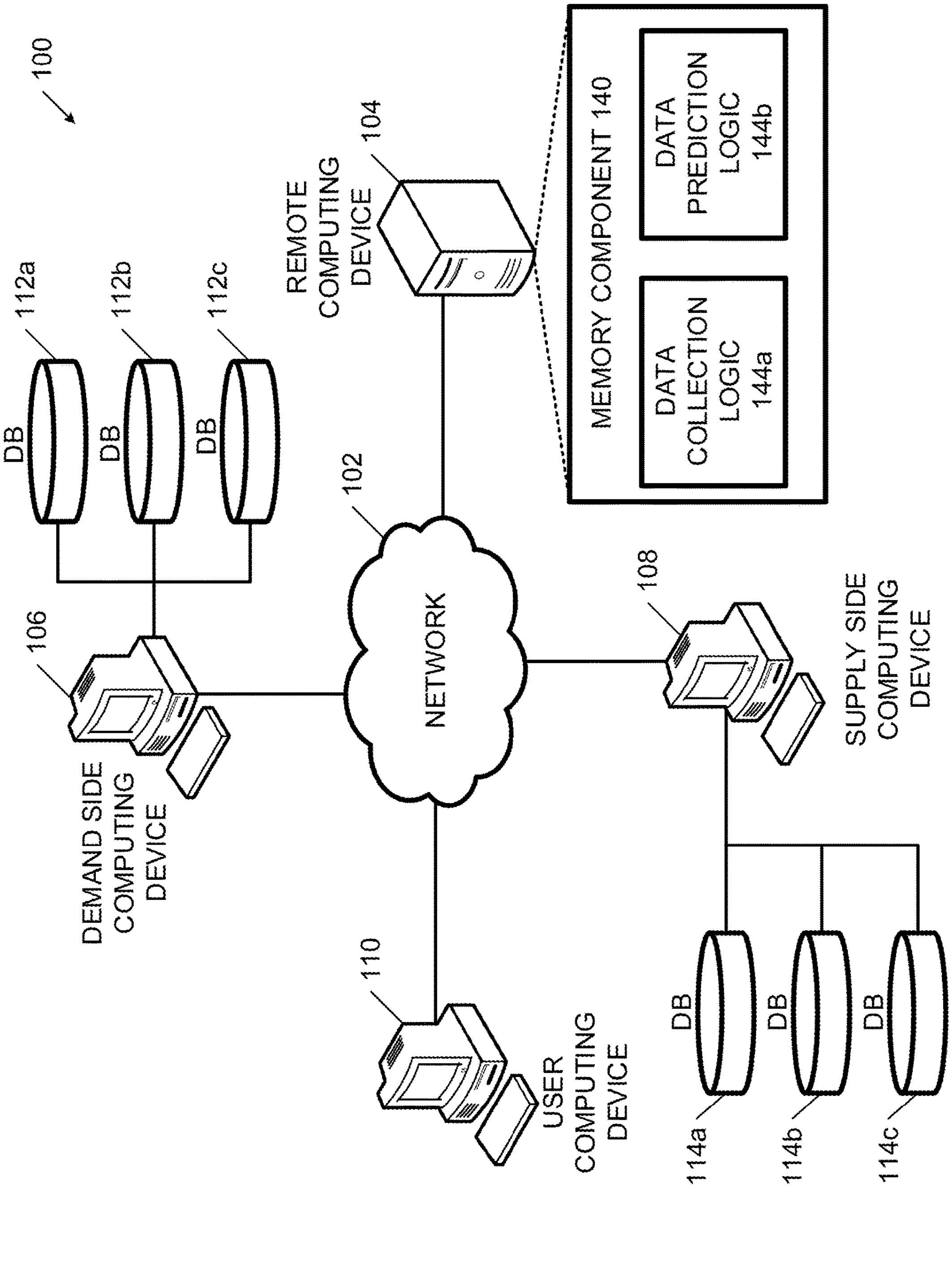
FIG. 1A schematically depicts a computing environment for predicting supply chain risk, according to one or more embodiments shown and described herein.

FIG. 1A depicts a computing environment 100 for predicting supply chain risk. The computing environment 100 generally includes a network 102 that is coupled to a remote computing device 104, a demand side computing device 106, a supply side computing device 108, and a user computing device 110.

The network 102 may include a wide area network (WAN), such as the internet, a public switched telephone network, a cellular network, a mobile data network, and/or the like, such as via (WiMax, LTE, 4G, 5G, etc.). The network 102 may include a local network, such as a wired network (e.g., such as via Ethernet, etc.), a wireless network (such as via Wi-Fi, etc.). The network 102 may similarly facilitate direct device-to-device communication, such as via Bluetooth, Zigbee, etc. Regardless, the network 102 may be configured to couple a the remote computing device 104 with the demand side computing device 106, the supply side computing device 108, and the user computing device 110.

The demand side computing device 106 may be coupled to one or more databases 112*a*, 112*b*, 112*c* for storing demand data. Specifically, the demand side computing device 106 represents one or more computing devices that communicates with entities that can be used to determine demand of one or more products or materials. Examples might include computing devices that store economic data, historical sales data, consumer price index data, product purchase order data, stock keeping unit (SKU) data, market data, production infrastructure data, material consumption data, etc. As such, the demand side computing device 106 may be implemented as a plurality of different computing devices one or more of which are operated by different entities. Similarly, the databases 112*a*, 112*b*, 112*c* represent the storage of data via any electronic storage medium, but where the various data may be received from different sources and/or relate to different parts of demand for a product.

Similarly, the supply side computing device 108 may represent one or more computing devices that determines supply data for one or more products. Specifically, the supply side computing device 108 represents one or more computing devices that communicates with entities that can be used to determine supply chain data of one or more products. Examples might include computing devices that store current inventory data, raw materials purchase orders data, transportation data, warehouse data, production infrastructure data, supplier data, etc. which may be used to determine redundancies, efficiencies, inefficiencies, strengths, weaknesses, etc. associated with the supply chain for one or more products. Thus, the databases 114*a*, 114*b*, 114*c*, which are coupled to the supply side computing device 108 represent the storage of data associated with the supply of one or more products.

It is noted that the description herein includes recitations of a supply chain "node" or "link." For the purposes of this application, a supply chain "node" is a location where goods are at rest (e.g., a production facility, a holding facility, a processing facility, etc.), and supply chain "links" are transportation lines along which goods are moved between nodes. As such, a product may have a "start node" and an "end node," where a "start node" is a node where the end product, a part of the end product, or a material used to produce the end product of the supply chain is first introduced into the supply chain (e.g., wherein the end product, part of the end product, or material used to produce the end product is first manufactured, produced, processed, extracted, procured, or otherwise generated), while an "end node" is a node where the end product exits the supply chain (by, e.g. consuming the end product, transferring the end product to a client, business partner, consumer, or other third party, or otherwise removing the end product from the control of the party or parties operating the supply chain). Similarly, a "delivery stream" is the order of nodes and links within a supply chain that a particular SKU of a product travels to navigate from the SKUs start node to end node. A product's supply chain may have multiple start and end nodes, so different individual SKUs of a product may have different delivery streams within the same supply chain (i.e., an individual SKU may not traverse every node and/or link within a single supply chain). Nodes and links of a supply chain, in addition to processes occurring in one or more nodes or links, are described herein collectively as "network elements." A supply chain and/or a delivery stream thereby may comprise many network elements, and a network element may comprise one or more nodes, links, and/or processes of a supply chain.

Figure 1B:
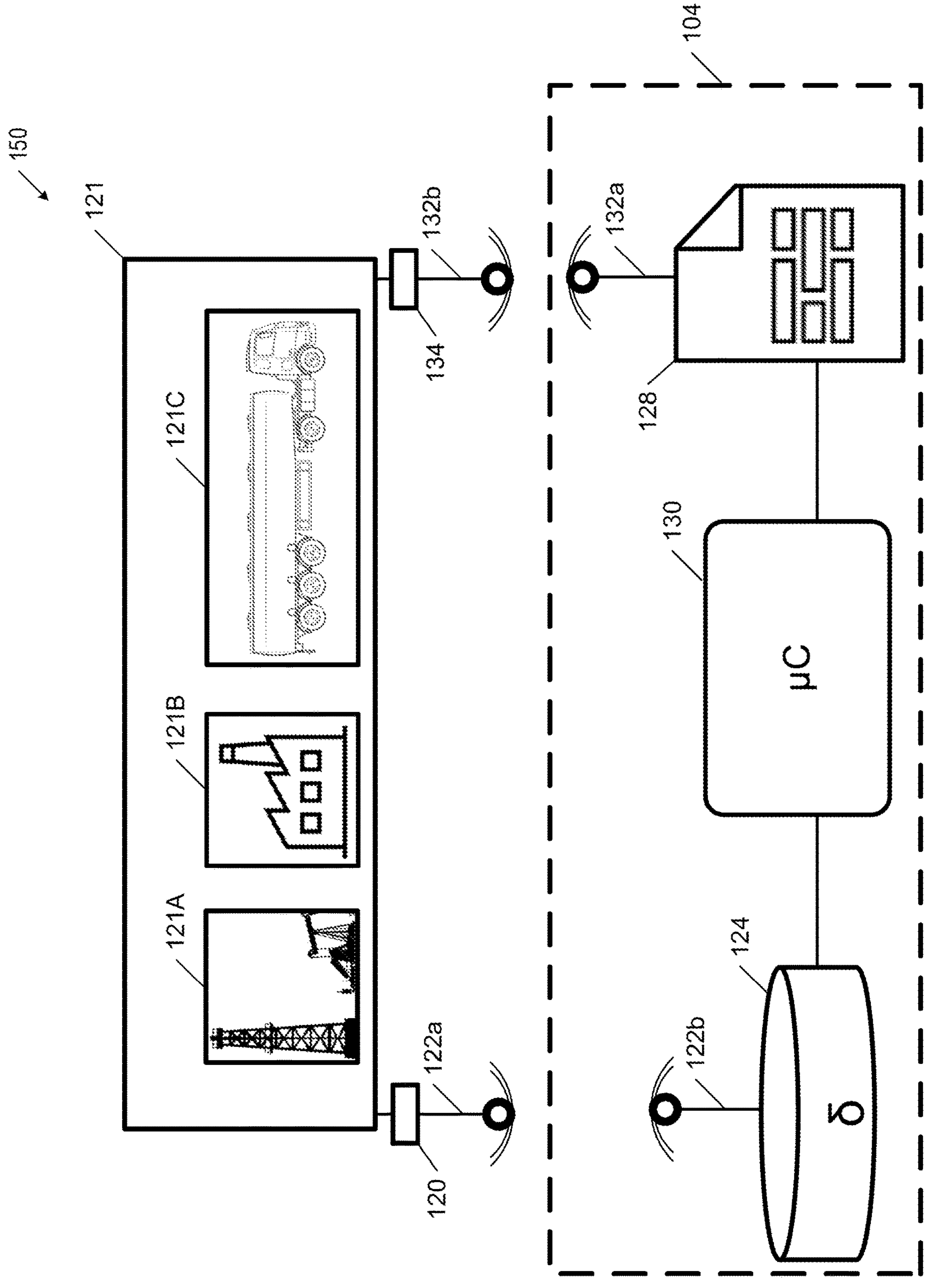
FIG. 1B schematically depicts other hardware for predicting supply chain risk and implementing results of supply chain risk prediction, according to one or more embodiments shown and described herein.

FIG. 1B depicts a system 150 for hydrocarbon supply chain modification based on predicted hydrocarbon supply chain risk. The system 150 provides input data and implements results of supply chain risk prediction for a hydrocarbon supply chain (e.g., a supply chain in which an end product of the supply chain is a refined or unrefined a hydrocarbon, including, e.g., crude oil, petroleum, natural gas, and/or any refined forms of the previous), according to embodiments provided herein. The supply chain of the system 150 comprises hydrocarbon supply chain network elements 121, including, in the embodiment depicted in FIG. 1B, a hydrocarbon extraction site 121A, a hydrocarbon refinement facility 121B, and an hydrocarbon transportation system 121C (e.g., a link wherein hydrocarbons or materials used to, e.g., produce, extract, or process hydrocarbons are transferred from a first node and/or first third party and to a second node and/or second third party) for transporting hydrocarbons from the hydrocarbon extraction site 121A and to the hydrocarbon refinement facility 121B, or from the hydrocarbon refinement facility 121B and to a third party (e.g., a consumer), or to and/or from any other node within the hydrocarbon supply chain of the system 150 and/or any third party.

In embodiments, the hydrocarbon extraction site 121A may include one or more drilling rigs, artificial lift systems (e.g., hardware used to reduce bottomhole pressure on a hydrocarbon-containing formation to obtain a higher production rate of hydrocarbons from the same), other facilities for hydrocarbon extraction, as may be understood by a person having ordinary skill in the art, and/or any combination thereof. In embodiments, the hydrocarbon refinement facility 121B may include one or more hydrocarbon refineries, hydrocarbon reactors, hydrocarbon separators, hydrocarbon processing units, other facilities for processing hydrocarbons, as may be understood by a person having ordinary skill in the art, and/or any combination thereof. In embodiments, the hydrocarbon transportation system 121C may include one or more networks of trucks, pipelines, planes, trains, water vessels, other hydrocarbon transportation mechanisms, as may be understood by a person having ordinary skill in the art, and/or any combination thereof.

In embodiments, the hydrocarbon supply chain network elements 121 may include one of, a plurality of, or none of any or all of the hydrocarbon extraction site 121A, the hydrocarbon refinement facility 121B and/or the hydrocarbon transportation system 121C, in any combination thereof. In embodiments, the hydrocarbon supply chain network elements 121 may include types of links or nodes not depicted in FIG. 1B (e.g., other links and nodes described below, such as any node wherein a material is). In embodiments, the hydrocarbon extraction site 121A may, alternatively, be any resource production node (e.g., a node wherein an end product of the supply chain, part of the end product, or material used to produce the end product is first manufactured, produced, processed, extracted, procured, or otherwise generated), such as types of nodes described elsewhere herein. In embodiments, the hydrocarbon refinement facility 121B may, alternatively, be any resource processing node (e.g., a node wherein an end product of the supply chain or materials used to produce the end product are manufactured, processed, produced, refined, or otherwise generated), such as types of nodes described elsewhere herein. In embodiments, the hydrocarbon transportation system 121C may be any link between nodes and/or third parties (e.g., a link wherein any end product of the supply chain or materials used to produce the end product(s) are transferred from a first node and/or first third party and to a second node and/or second third party), such as types of links described elsewhere herein.

The hydrocarbon supply chain network elements 121 may be a single supply chain node or process. The hydrocarbon supply chain network elements 121 may be a plurality of supply chain nodes, processes, links, or any combination thereof. The hydrocarbon supply chain network elements 121 may include all nodes of the system 150. The supply chain network elements 121 may include only some nodes of the hydrocarbon supply chain of the system 150. The hydrocarbon supply chain network elements 121 may include only a single node of the hydrocarbon supply chain of the system 150. The hydrocarbon supply chain network elements 121 may include all links of the hydrocarbon supply chain of the system 150. The hydrocarbon supply chain network elements 121 may include only some links of the hydrocarbon supply chain of the system 150. The hydrocarbon supply chain network elements 121 may include only a single link of the hydrocarbon supply chain of the system 150. The hydrocarbon supply chain network elements 121 may include all nodes and links of the hydrocarbon supply chain of the system 150. In embodiments, the hydrocarbon supply chain network elements 121 may include only some nodes and links of the hydrocarbon supply chain of the system 150.

As illustrated, hydrocarbon supply chain network elements 121 may include a hydrocarbon supply chain network element monitoring system 120 that may detect supply or demand data about the hydrocarbon supply chain network elements 121, including amounts and compositions of hydrocarbons stored, processed, and/or extracted in any of the hydrocarbon supply chain network elements 121 and amounts of materials stored and/or used in any of the hydrocarbon supply chain network elements 121 for the processing, extraction, use, and/or transportation of hydrocarbons at any of the hydrocarbon supply chain network elements 121. In some embodiments, the hydrocarbon supply chain network element monitoring system 120 may include or be coupled to at least one sensor, as well as a storage device that stores an identifier of a material e.g., consumed, processed, manufactured, produced, transported, and/or otherwise used within one or more nodes, links, or processes of the supply chain network elements 121, including the hydrocarbon extraction site 121A, the hydrocarbon refinement facility 121B, and the hydrocarbon transportation system 121C. In embodiments, the material may be any hydrocarbon (e.g., crude oil, petroleum, or natural gas), or a material consumed, processed, manufactured, produced, transported, and/or otherwise used in the extraction, processing, transportation, or use of hydrocarbons within the hydrocarbon supply chain. In embodiments, the hydrocarbon supply chain network element monitoring system may include physical sensors such as temperature sensors, pressure sensors, flow meters, scales, global positioning system trackers, and/or other physical sensors.

In some embodiments, the hydrocarbon supply chain network element monitoring system 120 may include physical sensors for determining quantities of a material consumed, processed, manufactured, produced, transported, and/or otherwise used in any of the hydrocarbon supply chain network elements 121, processing of the material, production of the material, or usage of the material in a node or link of the supply chain network elements 121 (e.g., one, some, or all of the hydrocarbon extraction site 121A, the hydrocarbon refinement facility 121B, and the hydrocarbon transportation system 121C), as described in more detail below. In embodiments, the hydrocarbon supply chain network element monitoring system 120 may include one or more physical sensors located at the hydrocarbon extraction site 121A for determining an amount of hydrocarbon and/or of phases of hydrocarbon stored at the hydrocarbon extraction site 121A, an amount of materials used or consumed in in hydrocarbon extraction stored at the hydrocarbon extraction site 121A, and/or an amount of hydrocarbon or of phases of hydrocarbon extracted in a given time period at the hydrocarbon extraction site 121A (e.g., on a per-day basis). In embodiments, the hydrocarbon supply chain network element monitoring system 120 may include one or more physical sensors located at the hydrocarbon refinement facility 121B for determining an amount of hydrocarbons or of phases of hydrocarbons stored at the hydrocarbon refinement facility 121B, an amount of materials used or consumed in hydrocarbon refinement stored at the hydrocarbon refinement facility 121B, and/or an amount of hydrocarbons refined at the hydrocarbon refinement facility 121B (e.g., on a per-day basis).

In some embodiments, the hydrocarbon supply chain network element monitoring system 120 may include physical sensors for determining quantities of the material, location of the material, estimated delivery dates of the material transported within a link of the hydrocarbon supply chain network elements 121 (e.g., the hydrocarbon transportation system 121C). In some embodiments, the hydrocarbon supply chain network element monitoring system 120 may include one or more physical sensors for determining a transportation capacity of the hydrocarbon transportation system 121C, including, e.g., a number of transportation vehicles available of the hydrocarbon transportation system 121C, locations of vehicles of the hydrocarbon transportation system 121C, total and/or available material carrying capacity (measured in, e.g., barrels of crude oil, petroleum, or natural gas) of one, some, or all vehicles of the hydrocarbon transportation system 121C, or stored amounts of fuel for operation of vehicles (e.g., trucks, pipelines, planes, or trains) of the hydrocarbon transportation system 121C. Accordingly, the hydrocarbon supply chain network element monitoring system 120 may include sensors for estimating delivery dates of hydrocarbons transported within the hydrocarbon transportation system 121C, a maximum throughput of the hydrocarbons within the hydrocarbon transportation system 121C, or a maximum amount of hydrocarbons which may be transported within the hydrocarbon transportation system 121C. For example, in embodiments, the hydrocarbon transportation system 121C transports hydrocarbons from the hydrocarbon extraction site 121A to the hydrocarbon refinement facility 121B and the physical sensors of the hydrocarbon supply chain network element monitoring system 120 include physical sensors for determining a location, quantity, estimated pick-up date (at the hydrocarbon extraction site 121A), or estimated delivery date (at the hydrocarbon refinement facility 121B) of hydrocarbons or materials (e.g., used or consumed at any of the hydrocarbon supply chain network elements 121) transported within the hydrocarbon transportation system 121C (e.g. for a particular shipment or purchase order).

The hydrocarbon supply chain network elements 121 may also include and/or be coupled with a transmitter 122*a* (which may be configured as a transmitter, receiver and/or a transceiver) for communicating the data from the hydrocarbon supply chain network element monitoring system 120 to the remote computing device 104. It should also be understood that "sensor data" may include demand data, supply data, and/or other data about one or more supply chain network elements of a supply chain, such as the data types described above and elsewhere herein.

The remote computing device 104 may also include or be coupled with a receiver 122*b* (which may be configured as a transmitter, receiver and/or a transceiver) for receiving the sensor data from the hydrocarbon supply chain network elements 121. Depending on the embodiment, the remote computing device 104 may receive sensor data from dozens, hundreds, or even thousands of different pieces of hardware at different past, present, or future hydrocarbon supply chain network elements across the globe (including, e.g., hydrocarbon extraction sites, hydrocarbon refinement facilities, and hydrocarbon transportation systems). The remote computing device 104 may include hydrocarbon supply chain data memory 124 (denoted in FIG. 1B as 8) for storing the received sensor data. Depending on the particular embodiment, the hydrocarbon supply chain data memory 124 may be configured as random access memory (RAM), read only memory (ROM), registers, a database, and/or other hardware for storing the sensor data. As such, the hydrocarbon supply chain data memory 124 may be part of the memory component 140 of FIG. 1A (described in further detail below with reference to FIG. 3), a data storage component (e.g., a data storage component 336 described below with reference to FIG. 3), and/or part of other data storage infrastructure.

A hydrocarbon supply chain risk predictor 130 (denoted in FIG. 1B as uC), represents software operations that are performed on the sensor data obtained from the hydrocarbon supply chain network element monitoring system 120. The hydrocarbon supply chain risk predictor 130 may include one or more pieces of software (such as the data collection logic 144*a*, the data prediction logic 144*b*, and/or other logical modules, including any or all of a hydrocarbon supply chain risk prediction module, a hydrocarbon supply chain risk prediction output translation module, a material forecasting module, an AI forecasting module, a Monte Carlo simulation module, an AI optimization module, and/or a mixed-integer linear programming module, as described in further detail below) and may be configured for modeling of historical data to predict supply chain risk, as described below with reference to FIG. 2.

The remote computing device 104 may also include a hydrocarbon supply chain risk prediction output translator 128 that is configured to create instructions to implement the results of this analysis including, e.g., hydrocarbon supply chain risk profiles and hydrocarbon supply chain risk mitigation levers. The hydrocarbon supply chain risk prediction output translator 128 may comprise any hardware configured to translate the output of the hydrocarbon supply chain risk predictor 130 into a form that can be used in the control of technical operations within the system and which, for example, may comprise a hardware driver or controller, a control data transmitter, a document printer, a data display, or any other hardware that generates an operations output that can be used in the system to alter, enhance, or otherwise control technical operations or create a technical effect within the system. The hydrocarbon supply chain risk prediction output translator 128 may be configured as part of the hydrocarbon supply chain risk predictor 130 and/or may be configured as a separate piece of hardware and/or software. These instructions may be communicated via a transmitter 132*a*, (which may or may not be the same hardware as receiver 122*b*) to hydrocarbon supply chain modification hardware 134. The hydrocarbon supply chain modification hardware 134 may include or be coupled with a receiver 132*b* for receiving instructions relating to implementation of hydrocarbon supply chain risk mitigation levers (e.g., modifications to processes or hardware at any of the hydrocarbon supply chain network elements 121) and implementing the hydrocarbon supply chain risk mitigation levers to modify the hydrocarbon supply chain, a delivery stream of the hydrocarbon supply chain, or one of the hydrocarbon supply chain network elements 121.

The hydrocarbon supply chain modification hardware 134 may include hardware located at any, some, or all of the hydrocarbon supply chain network elements 121, including any, some, or all of the hydrocarbon extraction site 121A, the hydrocarbon refinement facility 121B, and the hydrocarbon transportation system 121C. The hydrocarbon supply chain modification hardware 134 may include any hardware for modifying the hydrocarbon supply chain, modifying (e.g., hardware or a process of) any nodes of the hydrocarbon supply chain network elements 121 (including the hydrocarbon extraction site 121A and the hydrocarbon refinement facility 121B), and/or modifying (e.g., a start node or third party, an end node or third party, or a transportation mechanism) any links of the hydrocarbon supply chain network elements 121 (including the hydrocarbon transportation system 121C), as is described in further detail below, implementing purchase order updates for purchase orders relating to hydrocarbons and/or yet-unfulfilled purchase orders in the in response to identified hydrocarbon supply chain risk profiles, change a start node of the hydrocarbon supply chain (e.g., changing the start node from the hydrocarbon extraction site 121A to a different hydrocarbon extraction site or to a third-party supplier), changing an intermediary node of the hydrocarbon supply chain (e.g., changing the facility for hydrocarbon refinement for a purchase order from the hydrocarbon refinement facility 121B to a different hydrocarbon refinement facility), changing the end node of the hydrocarbon supply chain (e.g., changing the third-party to whom a shipment of hydrocarbons is delivered), changing a delivery stream of the hydrocarbon supply chain, changing third party contractors (e.g., outsourcing transportation of hydrocarbons from the hydrocarbon transportation system 121C to a third-party contractor), or changing materials consumed, processed, manufactured, produced, transported, and/or otherwise used within node(s) or link(s) within the hydrocarbon supply chain (e.g., materials used in hydrocarbon extraction at the hydrocarbon extraction site 121A or materials used in hydrocarbon processing at the hydrocarbon refinement facility 121B.

In embodiments, the hydrocarbon supply chain 134 may include any hardware for implementing modifications to the hydrocarbon supply chain or to one or more network elements of the hydrocarbon supply chain network elements 121 (including the hydrocarbon extraction site 121A, the hydrocarbon refinement facility 121B, and the hydrocarbon transportation system 121C). In embodiments, such hardware may include one or more of each of a flow rate valve, a hardware activation device, an instruction-issuing computing device, and/or other hardware. In embodiments, the flow rate valve may change, e.g., a hydrocarbon extraction rate (including ceasing hydrocarbon extraction) or other mechanical process at a node of the hydrocarbon supply chain network elements 121, such as the hydrocarbon extraction site 121A. In embodiments, the hardware activation device may mobilize hardware (e.g., an artificial lift system or a hydrocarbon refinement system) at a node of the hydrocarbon supply chain network elements 121, such as the hydrocarbon extraction site 121A and/or the hydrocarbon refinement facility 121B. In embodiments, the instruction-issuing computing device may issue instructions (e.g., by displaying instructions on one or more physical visual interfaces of the computing device or by sending notifications to one or more personal computing devices) to personnel of a node or link of the hydrocarbon supply chain network elements 121, such as the hydrocarbon extraction site 121A, the hydrocarbon refinement facility 121B, and/or the hydrocarbon transportation system 121C. In embodiments, the instruction issuing computing device may be a plurality of computing devices, each located at or associated with at least one respective node and/or link of the hydrocarbon supply chain elements 121, including the hydrocarbon extraction site 121A, the hydrocarbon refinement facility 121B, and/or the hydrocarbon transportation system 121C. In embodiments, the hydrocarbon supply chain modification hardware 134 may be or include the remote computing device 104.

In embodiments, the hydrocarbon supply chain modification hardware 134 may include hardware located at any, some, or all of the nodes and/or links of the supply chain network elements 121. For example, the hydrocarbon supply chain modification hardware 134 may include hardware located at the hydrocarbon extraction site 121A which may modify or issue an instruction to modify a rate at which hydrocarbons are extracted by the hydrocarbon extraction site 121A (e.g., the flow rate valve, the hardware activation device, the instruction-issuing computing device, and/or a physical visual interface of the instruction-issuing computing device), infrastructure for mobilizing hardware of the hydrocarbon extraction site 121A (e.g., the hardware activation device), and/or computing infrastructure for providing hydrocarbon extraction site personnel with instructions to implement, modify, or cease a drilling schedule of the hydrocarbon extraction site 121A (e.g., the instruction-issuing computing device or a physical visual interface of the instruction-issuing computing device). In another example, the hydrocarbon supply chain modification hardware 134 may include hardware located at the hydrocarbon refinement facility 121B which may modify or issue an instruction to modify a rate at which hydrocarbons are processed within the hydrocarbon refinement facility 121B (e.g., the flow rate valve, the instruction-issuing computing device, and/or a physical visual interface of the instruction-issuing computing device), infrastructure for mobilizing hardware of the hydrocarbon refinement facility 121B (e.g., the hardware activation device), and/or computing infrastructure for providing personnel with instructions to implement, modify, or cease a refinement schedule of the hydrocarbon refinement facility 121B (e.g., the instruction-issuing computing device or a physical visual interface of the instruction-issuing computing device). In another example, the hydrocarbon supply modification hardware 134 may include hardware located within the hydrocarbon transportation system 121C which may modify or issue an instruction to modify a shipment of hydrocarbons or other materials (e.g., materials used or consumed at the hydrocarbon extraction site 121A or the hydrocarbon refinement facility 121B) within the hydrocarbon transportation system 121C or a purchase order associated with the shipment (e.g., an amount of the material transported by the shipment, a pick-up date of the shipment, a delivery date of the shipment, a node or third party from which the shipment is picked up within the hydrocarbon transportation system 121C, or a node or third party to which the shipment is delivered within the hydrocarbon transportation system 121C; the hardware being, e.g., e.g., the instruction-issuing computing device or a physical visual interface of the instruction-issuing computing device), infrastructure for mobilizing a vehicle or vehicles of the hydrocarbon transportation system 121C (e.g., the hardware activation device, the instruction-issuing computing device, and/or a physical visual interface of the instruction-issuing computing device), and/or computing infrastructure for providing personnel with instructions to implement, modify, or cease a shipment, shipment schedule, or purchase order of or associated with the hydrocarbon transportation system 121C (e.g., a shipment, shipment schedule, or purchase order of hydrocarbons or of materials used or consumed at the hydrocarbon extraction site 121A or the hydrocarbon refinement facility 121B; the hardware being, e.g., the instruction-issuing computing device or a physical visual interface of the instruction-issuing computing device).

Referring again to FIG. 1A, it will be understood that the SKU data may be stored in one or more of the databases 112*a*, 112*b*, and/or 112*c* and may include data identifying materials, e.g., consumed, processed, manufactured, produced, transported, and/or otherwise used within a supply chain of a product, including the end product of the supply chain itself, and associated SKUs of each material or product. This information may be utilized for supply predication and/or demand prediction of the end product of the supply chain and of materials consumed in the production/manufacturing and transportation of the product. For example, if the end product of the supply chain is a refined hydrocarbon (e.g., gasoline), materials and the associated SKUs for the supply chain may include hydrocarbons (measured in, e.g., barrels of gasoline, as SKUs) but may also include materials necessary for, used in, or consumed by the extraction, distillation, and/or storage of hydrocarbons and in the transportation of hydrocarbons, and the aforementioned consumed materials in the supply chain of the hydrocarbons.

The purchase order data may also be stored in one or more of the databases 112*a*, 112*b*, and/or 112*c* and may include data for delivery streams of SKUs within a supply chain of a product, including SKUs of an end product of the supply chain. The purchase order data may thereby include purchase orders spanning a predetermined timeframe and for specific delivery streams of specific SKUs, such as, purchase orders for all delivery streams of all SKUs within the supply chain of the product spanning the previous five years. A purchase order may be a commercial order issued by a buyer to a seller (e.g., the entity producing, transporting, or selling the product at a node within the product's supply chain) for an end product of a supply chain or for a material necessary for, used in, or consumed by processes within the supply chain. As such, product purchase order history may be indicative of trends in demand for SKUs and may be used to predict future demand for SKUs including the end product of a supply chain and materials, e.g., necessary for, used in, or consumed by processes within the supply chain.

The market data may also be stored in one or more of the databases 112*a*, 112*b*, and/or 112*c* and may include external data (e.g., data relating to a broader market rather than a specific supply chain) regarding markets for or otherwise pertaining to demand for materials, products, and their associated SKUs including the materials, products, and SKUs. Such external data can include indicators of broader market demand for specific materials and products. For example, if the end product of the supply chain is a hydrocarbon, such as a distilled petroleum, gasoline, or natural gas, such indicators can include information regarding world events, pending legislation, predicted severity of winters, etc. which may have a determinative effect on the demand for the hydrocarbons. Further, in the same example, indicators can also include indicators of demand for materials necessary for, used in, or consumed by processes within the supply chain, such as changes in technology resulting in changes in quantities of necessary materials for the production and delivery of an SKU of hydrocarbons within the supply chain of the hydrocarbon. As such, external data can be used to predict future demand for SKUs within the supply chain.

The production infrastructure data may also be stored in one or more of the databases 112*a*, 112*b*, and/or 112*c*. Production infrastructure data may include data pertaining to the available infrastructure at production sites (including the current state of such infrastructure), which may determine or otherwise affect the production capacity of a product or consumption rates of materials within a particular production site. Further, the production infrastructure data may include planned future changes to production infrastructure (e.g., planned repairs or planned upgrades) which may affect production (by temporarily lowering production capacity or permanently increasing production capacity). As such, production infrastructure data may be indicative of future material consumption and material demand.

The historical sales data may also be stored in one or more of the databases 112*a*, 112*b*, and/or 112*c* and may include historical sales of an end product of a supply chain. (dating back, e.g., 5 years). Historical sales data may be indicative of seasonal changes in product demand, long-term (e.g., over the span of several years) changes in product demand, or other related trends in product demand.

Referring again to FIG. 1A, the remote computing device 104 may include a memory component 140, which stores data collection logic 144*a* and data prediction logic 144*b*. Specifically, the data prediction logic 144*b* may include a material forecasting module. The material forecasting module may cause the remote computing device 104 to process data including, e.g., material inventory, material consumption, and production planning data to produce a material forecast. As discussed above, the supply-related data may include data associated with nodes and links end-to-end across the at least a portion (and, in some embodiments, across the entirety) of a supply chain and materials and products consumed, processed, manufactured, produced, transported, and/or otherwise used along the entirety of the supply chain. As a result, the material forecasting module may thereby cause the remote computing device 104 to process data relating to the entirety of a supply chain end-to-end and, similarly, produce outputs consisting of material consumption data relating to nodes and links end-to-end across the entirety of a supply chain. The material forecasting module may thereby be a model (e.g., an AI, ML, Monte Carlo simulation, or other algorithm) which produces a single value or range of values indicating a quantity of SKUs for a material held in inventory at a node or nodes in a supply chain including the materials and products.

Calculation of material forecasts by the material forecasting module may occur, in some embodiments, at an interval of seconds, hours, days, weeks, months, etc. Further, and particularly in examples of supply chains for hydrocarbons, there may be dozens, hundreds, or thousands of nodes in a supply chain and dozens, hundreds, or thousands of categories of SKUs in each supply chain.

The material consumption data may also be stored in one or more of the databases 112*a*, 112*b*, and/or 112*c* and may include historical material consumption data (e.g., historical data regarding material consumption at nodes within the supply chain dating back, e.g., 5 years and end-to-end across the supply chain), approved material consumption forecasts (e.g., material consumption forecasts reviewed and endorsed by business leaders), and live AI-generated material forecasts (as described above). For example, material consumption data for a hydrocarbon refinement facility may include materials consumed during a hydrocarbon refinement process, including material consumption statistics over the previous 5 years (i.e., historical material consumption data), projections based on planned changes to refinery equipment or production capacity (i.e., approved material consumption forecasts), and an automated forecast based on up-to-date statistics (i.e., live AI-generated material forecasts). Material consumption data may not be constant across like nodes (e.g., across some or all production/manufacturing nodes of a product supply chain) or links; instead, such may vary due to a location, climate, or other contextual factor of the node or link, the equipment available in the node or link, and other factors. However, material consumption at an individual link or node may also be influenced by factors common to all nodes (e.g., changes to production schedules supply chain-wide or technological advances in production efficiency), and so automated material forecasting may require both node- or link-specific data in addition to data spanning end-to-end across a supply chain and external data (e.g., market data).

Some embodiments may be configured such that the remote computing device 104, via the data collection logic 144*a*, requests and/or receives demand side data from the demand side computing device 106, as well as supply side data from the supply side computing device 108. The data prediction logic 144*b* may then cause the remote computing device 104 to predict supply side constraints, as well as possible demand side changes (including a demand quantity predictor) and compare the supply side predictions with the demand side predictions to predict risks regarding whether supply will meet supply. If a prediction is made that supply cannot (or may not) meet demand, some embodiments are configured to determine changes to the supply chain to alleviate the predicted problem. As least a portion of this information may be provided to the user computing device 110 for display. Some embodiments may be configured to provide an interactive user interface via the user computing device 110 that allows a user to make changes to the supply chain to predict changes in the supply of one or more products.

Specifically, demand quantity predictors may be configured as forecasts of future production, use, or consumption of materials (e.g., in terms of SKUs) in a delivery stream. As such, a demand quantity predictor may be a holistic indicator produced by processing of SKU, material, product, purchase order, and/or market data to forecast future demand of individual materials or products at various nodes within a supply chain. The data prediction logic 144*b* may therefore include a model (e.g., an AI, ML, Monte Carlo simulation, or other algorithm) that uses the demand side data and/or the supply side data to produce a single value or range of values indicating a quantity of SKUs for a material consumed, processed, manufactured, produced, transported, and/or otherwise used within a link or node in a supply chain. By quantifying a holistic indicator of future demand in terms of SKU quantities, the data prediction logic 144*b* may cause the remote computing device 104 produce data to determine supply chain risk profiles and risk mitigation levers which may reduce the probability and/or severity of supply chain risk profiles.

Calculation of demand quantity predictors may occur, in some embodiments, at an interval of seconds, minutes, hours, days, weeks, etc. Further, and particularly in examples of supply chains for hydrocarbons, there may be dozens, hundreds, or thousands of nodes in a supply chain and dozens, hundreds, or thousands of categories of SKUs in each supply chain. Additionally, the databases 112*a*-112*c*, 114*a*-114*c* may store data reflecting values for at least a portion of the nodes across a determined time span (e.g., the prior 5 years). As such, the remote computing device 104 may calculate demand quantity predictors due to, e.g., the volume of data processed, the interval of processing, and the volume of predictors generated at each interval of processing.

The material inventory data may be stored in one or more of the databases 114*a*, 114*b*, and/or 114*c* and may include values indicating inventory amounts in SKUs for materials (e.g., the materials and products) within a supply chain. The material inventory values may be determined and stored at a particular interval (e.g., daily, weekly, monthly, etc.) and/or for a certain timespan (e.g., values for each month of the 5 years prior to the current month). In some embodiments, the material inventory values may be a value (per SKU) representing a present inventory amount for the SKU, and the value may be updated in real time or at a specified interval (e.g., daily). Additionally, the material inventory data may include values indicating material inventories at a single node in a supply chain (e.g., a production facility), inventories across certain stages of a supply chain (e.g. at every node representing a production facility), or inventories along a specific route within a supply chain (e.g., at a set of sequential nodes connected by a series of links). Present and past material inventory data may indicate trends and/or present deficiencies or surpluses in material inventories, and material inventory data may thereby be predictive of future material inventories.

The transportation data may also be stored in one or more of the databases 114*a*, 114*b*, and/or 114*c* and may include values indicating shipment tracking, distances and transportation methods used in particular links, including third party agreements for transportation such as charter party agreements, and links associated with particular nodes. This may include data describing shipment links for inventory materials consumed in a node as well as distribution links for products produced by a load. Such data can be indicative of future inventories by indicating the time required for a purchase order to be fulfilled or indicating the time necessary to deliver a product shipment from a particular production node. As such, transportation data may be indicative of trends and/or future deficiencies or surpluses in material inventories by indicating an amount of lead time necessary to place a raw material purchase order. Additionally, transportation data may include data about third-party transportation entities (e.g., contractors), including data pertaining to third-party transportation performance, such as delivery time, reliability, etc., which may thereby indicate expected shipment times based on a choice of third-party transportation entity.

The supplier data may also be stored in one or more of the databases 114*a*, 114*b*, and/or 114*c* and may include data pertaining to third parties who fulfill purchase orders for raw materials. The supplier data may include supplier pricing information, supplier contract information including charter party agreements, and supplier performance data tracked over time indicating, e.g., supplier reliability, quality of supplied materials, cost of using the supplier, supplier delivery time etc. Supplier data may thereby indicate an affect a choice of supplier may have on projected inventory levels, projected costs of maintaining inventory, risks to future inventory levels, etc. Supplier may be tracked for a supplier generally (i.e., via a holistic score associated with the particular third party), for a particular key performance indicator ("KPI"; e.g., the supplier performance data types identified above), for a particular material or service, etc.

The material data may also be stored in one or more of the databases 114*a*, 114*b*, and/or 114*c* and may include values indicating quantities or rates of consumption of SKUs (e.g., necessary for, used in, or consumed by processes within the supply chain). The material consumption data may be determined and stored at a particular interval (e.g., daily, weekly, monthly, etc.) and/or for a certain timespan (e.g., values for each month of the 5 years prior to the current month). Additionally, the material consumption data may include values indicating material consumption quantities at a single node in a supply chain (e.g., a production facility), inventories across certain stages of a supply chain (e.g. at every node representing a production facility), or inventories along a specific route within a supply chain (e.g., at a set of sequential nodes connected by a series of links). For example, if the end product of the supply chain is a refined hydrocarbon, a single node may be an extraction site for hydrocarbon extraction and the material consumption data for that node may indicate a quantity or rate of SKUs of materials consumed in the process of extracting, storing, or refining hydrocarbons. The quantity may indicate the number of SKUs consumed at that node in a month, and the rate may indicate an (e.g., monthly) average of SKUs consumed over the course of a specified time span (e.g., the prior five years). Present and past material consumption data may indicate trends and/or future deficiencies or surpluses in material inventories, and material consumption data may thereby be predictive of future material inventories.

The warehouse data may also be stored in one or more of the databases 114*a*, 114*b*, and/or 114*c*, and may include data pertaining to the available infrastructure at nodes for storage of a material or product, which may affect material inventory projections due to, e.g., storage capacity provided by existing infrastructure.

The production planning data may also be stored in one or more of the databases 114*a*, 114*b*, and/or 114*c* and may include data indicating any business plans pertaining to, e.g., production, inventory, or consumption for a set time period from the present date (e.g., 2 years). The production planning data may be values indicating future benchmarks (e.g., production volume targets) associated with particular dates, future changes to overall production capacity (e.g., an opening date for a new production facility and associated expected production capacities associated with the production facility), or future changes to production capacity of a single node (e.g., an anticipated decrease in production capacity at a production facility for a time period in which the facility is expected to undergo refurbishing of production infrastructure). For example, if the end product of the supply chain is a hydrocarbon, production planning data may include future hydrocarbon extraction site menus or drilling business plans as determined by business management. Production planning data may thereby be predictive of future material inventories due to the effects that production plans may have on acquisition, use, and/or consumption of those material inventories.

The raw materials purchase orders data may also be stored in one or more of the databases 114*a*, 114*b*, and/or 114*c* and may include data pertaining to requested, scheduled, or placed purchase orders for raw materials (e.g., materials used or consumed by processes within a product supply chain or within a particular node or link of a product supply chain). The raw materials purchase orders data may thereby indicate supply schedules for material inventories, and be used to project future changes to current inventory due to already-planned or ongoing inventory resupplying processes.

The material consumption data may also be stored in one or more of the databases 114*a*, 114*b*, and/or 114*c*. The material consumption data may pertain to material inventory forecasts output by the material forecasting module. In this embodiment, material forecasts are forecasts of future material inventories (e.g., in terms of SKUs). As such, a material forecast may be a holistic indicator produced by processing of material inventory, material consumption, and production planning data to forecast future SKU quantities of inventories of materials at various nodes within a supply chain. By quantifying a holistic indicator of future SKU quantities held in material inventories, the material forecasting module can produce data usable by the supply chain risk prediction model to generate supply chain risk profiles and risk mitigation levers which may reduce the probability and/or severity of supply chain risk profiles.

The production infrastructure data, as described above, may also be stored in one or more of the databases 114*a*, 114*b*, and/or 114*c*. Since the production infrastructure data may include information describing available infrastructure at production sites and associated production capacities, the production infrastructure data may thereby be indicative of potential future changes in material consumption or material inventory.

The data prediction logic 144*b* may include a supply chain risk prediction model. The supply chain risk prediction model may cause the remote computing device 104 to process data including, e.g., the types of data described above and other data. The supply chain risk prediction model may cause the remote computing device 104 to generate supply chain risk alerts, calculate supply chain risks, and highlight issues in the supply chain that otherwise may go overlooked. In some embodiments, the supply chain risk prediction model cause the remote computing device 104 to output such risks only in response to a predetermined user action. In some embodiments, the supply chain risk prediction model may cause the remote computing device 104 to access and process data inputs at a predetermined time interval (e.g., daily, weekly, monthly, etc.) to provide a regular and automated mechanism for alerting users to supply chain risks. A supply chain risk alert may include a supply chain risk profile (as described in further detail below) for a particular node, link, material, or product in a supply chain and the supply chain risk alert may further include, if available or relevant to the particular supply chain risk profile, risk mitigation levers which the supply chain risk prediction model identifies as reducing the probability and/or severity of the risk profile. The supply chain risk prediction model, via supply chain alerts, can highlight risk profiles to provide advance notice to users of potential risks and thereby prevent potential negative outcomes of such risks such as, e.g., stock-outs or delays, increasing the likelihood of maintaining on-time deliveries of SKUs. By processing data relating to nodes across the entire supply chain, the supply chain risk prediction model can thereby provide alerts which may permit early detection of and proactive management in response to risk profiles.

As described above and due to the volume of data required (e.g., several millions of data records) to be processed to calculate risk profiles, the volume of calculations required to conduct such processing, and due to the frequency at which such processing must occur (i.e. in real time as supply chain data is updated to provide timely and regular supply chain risk alerts), such calculations generally require a the remote computing device 104. Without regular and/or constant processing (e.g., at a daily or weekly interval, or in real time as supply chain data records are updated) of data by the remote computing device 104 via the supply chain risk prediction model, the supply chain risk prediction would be unable to provide risk alerts at intervals necessary to enable a user to adequately avoid potential negative outcomes caused by the manifestation of a supply chain risk.

The supply chain risk prediction model may generate supply chain risk profiles. A supply chain risk profile may identify or estimate (e.g., at an individual supply chain node or link, across a plurality of supply chain nodes or links, or for one or more materials or products in a supply chain) the nature of a risk, the probability of a risk's negative consequences manifesting, and the severity of a risk's negative consequence should the risk manifest. For example, if the end product of the supply chain is a hydrocarbon, then a risk profile output of the supply chain risk prediction model could include material delay risks or stock-out risks at a hydrocarbon extraction site. The risk profile may further include an associated estimated probability of such a risk's negative consequences manifesting (e.g., as in the prior example, material delays or stock-outs). Similarly, the risk profile may include an estimated severity of the negative consequence. In different embodiments, the severity of a negative consequence may be measured in different ways, including an associated estimated temporal or financial cost associated with the negative outcome's manifestation. In the prior example, such a severity measure may, in some embodiments, be an estimated time for restocking or producing more quantities of the material, or, in other embodiments, the severity may be an estimated cost associated with material delays or stock-outs (e.g., by necessitating air-freight or emergency POs). By estimating and highlighting these risk profiles, the supply chain risk prediction model can identify to a user causes for concern ahead of time and reduce the need for last-minute actions to alleviate or mitigate the negative outcome associated with a risk if and when the negative outcome manifests.

A supply chain risk profile may contain additional contextual information further defining the nature of the identified risk and/or cause(s) of the identified risk. For example, if the identified risk is an inventory blockage (e.g., a delay in resupplying a particular inventory material), then the risk profile may include information identifying an estimated duration (e.g., via an AI or ML model prediction) or actual duration (if a supplier has identified when a purchase order which may end the blockage will be fulfilled) of the inventory blockage and an identified cause or identified causes of the blockage. This contextual information may be used not only in a visualization (as described in further detail below) to provide a user with additional information describing the identified risk but further in determining proposed risk mitigation levers (as also described in further detail below).

In some embodiments, the supply chain risk prediction model may cause the remote computing device 104 to set risk thresholds for either or both of risk alerts or provide risk profiles for display. In those embodiments, the supply chain risk prediction model may not output a risk alert and/or risk profile if, e.g., an estimated risk probability or severity is not met or if some other predetermined threshold or criteria is not met.

In some embodiments, the supply chain risk prediction model may cause the remote computing device 104 to generate a visualization of such supply chain risk profiles. Such visualizations may include, e.g., interactive virtual interfaces which may be sent to the user computing device 110 such that the user may view and manipulate the interface and data displayed therein. Such visualizations may include depictions of nodes or links within the supply chain and provide a mechanism by which the user can identify individual risk profiles at individual nodes or links within the supply chain. Further, and as will be described in further detail below, the visualization of supply chain risk profiles can include the display of an array of proposed risk mitigation levers for any individual risk profiles or plurality of risk profiles. Further, the risk profile visualization can display scenario modeling and data visualizations associated with each of the proposed risk mitigation levers.

In some embodiments, the supply chain risk prediction model may cause the remote computing device 104 to generate proposed risk mitigation levers. A proposed risk mitigation lever may be a modification to an element or elements of the supply chain which the supply chain risk prediction model identifies as lowering the probability and/or severity of an identified risk profile. Proposed risk mitigation levers are actions, potentially presented as a menu of options, which the supply chain risk prediction model causes the remote computing device 104 to identify as mitigating the probability or severity of an identified risk profile. Such risk mitigation levers may include proposing purchase order updates for purchase orders relating to SKU materials or products and/or yet-unfulfilled purchase orders in the in response to identified supply chain risk profiles. Such proposed purchase order updates may include the submission of new purchase orders or the updating of an existing or proposed unfulfilled purchase orders (to reduce the likelihood of material stock-outs, the need for emergency purchase orders, the otherwise delayed response of a team to a risk or a risk's negative consequence) including modification of PO timing, quantity, choice of supplier, and/or choice of transportation mode. Other risk mitigation levers may include changing a start node of a supply chain, changing the end node of a supply chain, changing a delivery stream of a supply chain, changes in third party contractors (for transportation between supply chain nodes), or changing materials consumed, processed, manufactured, produced, transported, and/or otherwise used within node(s) or link(s) within the supply chain. Identifying a change in materials consumed, processed, manufactured, produced, transported, and/or otherwise used within a node or link may include consideration of inventories at other node(s) or link(s) and transportation of such materials to the node(s) or link(s) in which the substitute material is needed. The supply chain risk prediction model may cause the remote computing device 104 to generate several proposed risk mitigation levers for any identified risk profile, and a risk profile visualization, as described above, may present each of the proposed risk mitigation levers to a user to allow the user to compare each proposed risk mitigation lever with scenario modeling and data visualization.

Scenario modeling for a proposed risk mitigation lever may include identifying subsequent effects of choosing a particular risk mitigation lever. Effects may include an associated reduction in an estimated probability or severity value associated with the risk profile. Effects may also include subsequent necessary changes to a delivery stream. For example, changing the node at which a product is produced to fulfill a purchase order may necessarily require changes to intermediary links and nodes between the production node and the product's end node along the supply chain. Since data in the databases 112*a*-112*c*, 114*a*-114*c* spans nodes and links end-to-end across a supply chain, the supply chain risk prediction model can cause the remote computing device 104 to model such scenarios resulting from the choice of a risk mitigation lever end-to-end at nodes and links spanning the entirety of the supply chain, rather than being isolated to first-order consequences of actions at an individual supply chain link or node. The remote computing device 104 may conduct such scenarios by utilizing an AI or ML model of the data prediction logic 144*b* to predict results of and (if necessary) identify subsequent necessary supply chain changes necessitated by a proposed risk mitigation lever. For example, if one material is substituted, by a risk mitigation lever, for another in production at a production node, then a subsequent change may include a change in time to complete a PO and may, thereby, result in the need for subsequent changes in planned PO fulfillment strategy. In a visualization interface, as will be described in further detail below, such subsequent necessary supply chain changes may be modifiable by a user of the user computing device 110.

Data visualization may include a comparison of effects on estimated probability or severity of risk profiles resulting from different risk mitigation levers. Data visualization may also include visualization of changes in values such as, e.g., estimated purchase order fulfillment dates, estimated product production dates, or necessary subsequent changes in supply chain nodes and links use din delivery streams, as described above. The data visualizations may also include assessments of lead times associated with implementations of a risk mitigation lever and cost and value impacts associated with adopting an action associated with a risk mitigation lever. Such data visualizations may thereby provide a mechanism by which a user of the user computing device 110 can compare different risk mitigation levers by comparing, e.g., the necessary time for implementation, associated costs, associated subsequent effects on delivery streams, and/or necessary lead times for implementation of a proposed risk mitigation lever.

Visualizations generated by the remote computing device 104 may include visualizations integrated into a broader digital twin, which may span part of a supply chain or end to end across the entirety of a supply chain. Supply chain alerts may thereby be integrated into a visualization interface (displayed by the user computing device 110) of the digital twin, permitting a user to view supply chain information in concert with predicted supply chain risks, supply chain risk alerts, and proposed risk mitigation levers associated with each alert. Alerts may be sorted categorically in the visualization to identify a type of risk associated with the risk alert, including categories such as strategic planning, material forecast, material procurement, supplier fulfillment, inventory, and consumption. For example, a supplier fulfillment alert may indicate a delivery schedule change for a particular purchase order at a particular node, and a consumption alert may indicate a change in consumption trends at a production node. The visualization may indicate all relevant data, insights, and actions related to the alert, including a confidence interval or accuracy metric associated with the alert and/or the alert's underlying identified risk, an inventory health metric (indicating a percentage of maximum inventory or a percentage of actual accounted for inventory compared to necessary inventory at a particular point in time), a monetary value associated with a risk (i.e., the severity of the manifestation of the risk) and/or the underlying process of a risk (i.e., the value of a purchase order of which there is an identified risk of fulfilment failure), information indicating the node(s) or link(s) affected by a risk, KPIs associated with/affected by an identified risk, etc.

In some embodiments integrated within a broader supply chain digital twin, the risk mitigation levers may be displayed (e.g., by the user computing device 110) in a visualization interface, such as the visualization interface described above, along with data associated with an alert corresponding to the risk the risk mitigation levers are identified to mitigate. For example, an interface may display current POs, historical data (e.g., related to PO fulfillment, material consumption, etc.) as well as potential or optimized data indicating projected changes to supply chain projections (e.g., inventory levels) upon the implementation of a risk mitigation lever. The visualization interface may further enable customization of a proposed risk mitigation lever or levers, such as, e.g., altering proposed PO modifications. Additionally the visualization may enable a user to submit a request or command to implement a selected risk mitigation lever. Further, in embodiments incorporated into a broader digital twin, the digital twin may thereby update projections across the supply chain and provided to some or all users of the digital twin incorporating the selected risk mitigation lever.

A visualization generated by the remote computing device 104 may be localized to a particular user of the user computing device 110 (e.g., a particular buyer or supply chain manager), displaying alerts, risks, and/or proposed risk mitigation levers specific to the user's, credential or approved decision-making authority. Additionally, if, for a specific alert, risk, and/or proposed risk mitigation lever, there are multiple responsible agents (i.e., multiple users who may be permitted to view a risk or select a proposed risk mitigation lever), the visualization may enable users who are such responsible agents to communicate with other such responsible agents indicating choice of risk mitigation lever or in an approval hierarchy, requesting approval to enact a user-selected risk mitigation lever.

By alerting users to risks end-to-end across a supply chain, providing and visualizing risk profiles associated with each risk, proposing risk mitigation levers for each risk profile, and enabling scenario modeling, data visualization, and option comparison between each risk mitigation lever, the supply chain risk prediction model may thereby enable accurate calculation of net requirements for purchase orders and material or product use, consumption, or production over time. Such user support optimizes the volume-planning of materials and products, preemptively addresses under-stocking and over-stocking of materials, and minimizes making last minute actions such as air-freight and emergency purchase orders to instead address under- and over-stocking of materials. By using data, identifying risk profiles, providing risk mitigation levers, and enabling scenario modeling, data visualization, and option comparison end-to-end across a supply chain, the supply chain risk prediction model can cause the remote computing device 104 to simplify large supply chains and large quantities of data associated with nodes, links, materials, and products associated with such supply chains to enable a user to readily identify and react to risks along a supply chain. Further, the supply chain risk prediction model can cause the remote computing device 104 to simplify such large supply chains and large quantities of data at regular time intervals (e.g., daily, weekly, or monthly) to alert users to risks without requiring user input or querying of the remote computing device 104. As such, the remote computing device 104 may enable end-to-end control of a large supply chain and enable the reduction of risk end-to-end across a large supply chain.

The supply chain risk prediction model may use a plurality of individual modules to process data and produce the above-described outputs. Each module may be an algorithm using some or all of the entirety of the data inputs provided to the supply chain risk model and each module may contribute to all or some of the outputs generated by the risk prediction model. Different modules within the supply chain risk prediction model may produce separate outputs of data that is nonetheless related (e.g., several module producing different risk probability estimations for a single risk profile), and so outputs of various modules of the supply chain risk prediction model may be harmonized via one or more of a variety of algorithms (such as statistical confidence interval calculation and comparison) to produce a single unified output value (e.g., a single risk probability estimation for a single risk profile).

The supply chain risk prediction model may include an AI forecasting module. The AI forecasting module may be configured as an AI forecasting algorithm. In some embodiments, the AI forecasting algorithm may be an open-source algorithm such as the Facebook Prophet™. The AI forecasting module may be used to estimate risk profiles and model scenarios resulting from a choice of proposed risk mitigation levers including changes to risk profile probability and severity. Since the data received by the AI forecasting module may contain data spanning nodes and links end-to-end across a supply chain, the algorithm of the AI forecasting module may be trained using datasets spanning several years and the entirety of a supply chain to increase the accuracy of the AI forecasting module's outputs and to increase the breadth of predictions made by the AI forecasting module.

The supply chain risk prediction model may include a Monte Carlo simulation module. The Monte Carlo simulation module is, in this embodiment, a Monte Carlo simulation algorithm which evaluates risk probabilities. Since the data received by the supply chain risk prediction model includes data spanning nodes and links end-to-end across a supply chain, the algorithm of the Monte Carlo simulation module may use, as historical data, datasets spanning several years and the entirety of a supply chain end-to-end. Access to end-to-end data across a supply chain may enable the Monte Carlo simulation module to provide an increased level of accuracy of risk profile probabilities compared to a Monte Carlo simulation with access to historical data pertaining to a single node or a limited set of nodes within a supply chain.

As will be described in further detail below, the supply chain risk prediction model may cause the remote computing device 104 to output a limited set of proposed risk mitigation levers rather than all possible risk mitigation levers identified by the supply chain risk prediction model. The supply chain risk prediction model may cause the remote computing device 104 to identify which risk mitigation levers to present to the user as proposed risk mitigation levers by selecting only risk mitigation levers which reduce the severity or probability of a risk profile and/or only risk mitigation levers which do not provide comparatively less utility than another available risk mitigation lever. To determine which potential risk mitigation levers to present as proposed risk mitigation levers, the supply chain risk model may include an AI optimization module and/or a mixed-integer linear programming (MILP) module.

The AI optimization module may be an AI optimization algorithm trained on datasets sourced end-to-end across a supply chain including categories of data described above. Similarly, the MILP module may be an MILP optimization algorithm whose source data includes datasets sourced end-to-end across a supply chain (e.g., categories of data described above) and whose constraints are predetermined or provided by a user via the user computing device 110. The AI optimization module and MILP module may thereby cause the remote computing device 104 to deduce best actions for the supply chain risk prediction model to output as proposed risk mitigation levers by comparing individual actions against associated constraints or cost values such as a minimum necessary reduction in risk probability or severity, a maximum cost associated with implementing a risk mitigation lever, or a comparative utility of one risk mitigation lever to another.

The supply chain risk prediction model may thereby cause the remote computing device 104 to calculate risk profiles and output risk alerts, risk profiles, visualizations, and proposed risk mitigation levers.

Figure 2:
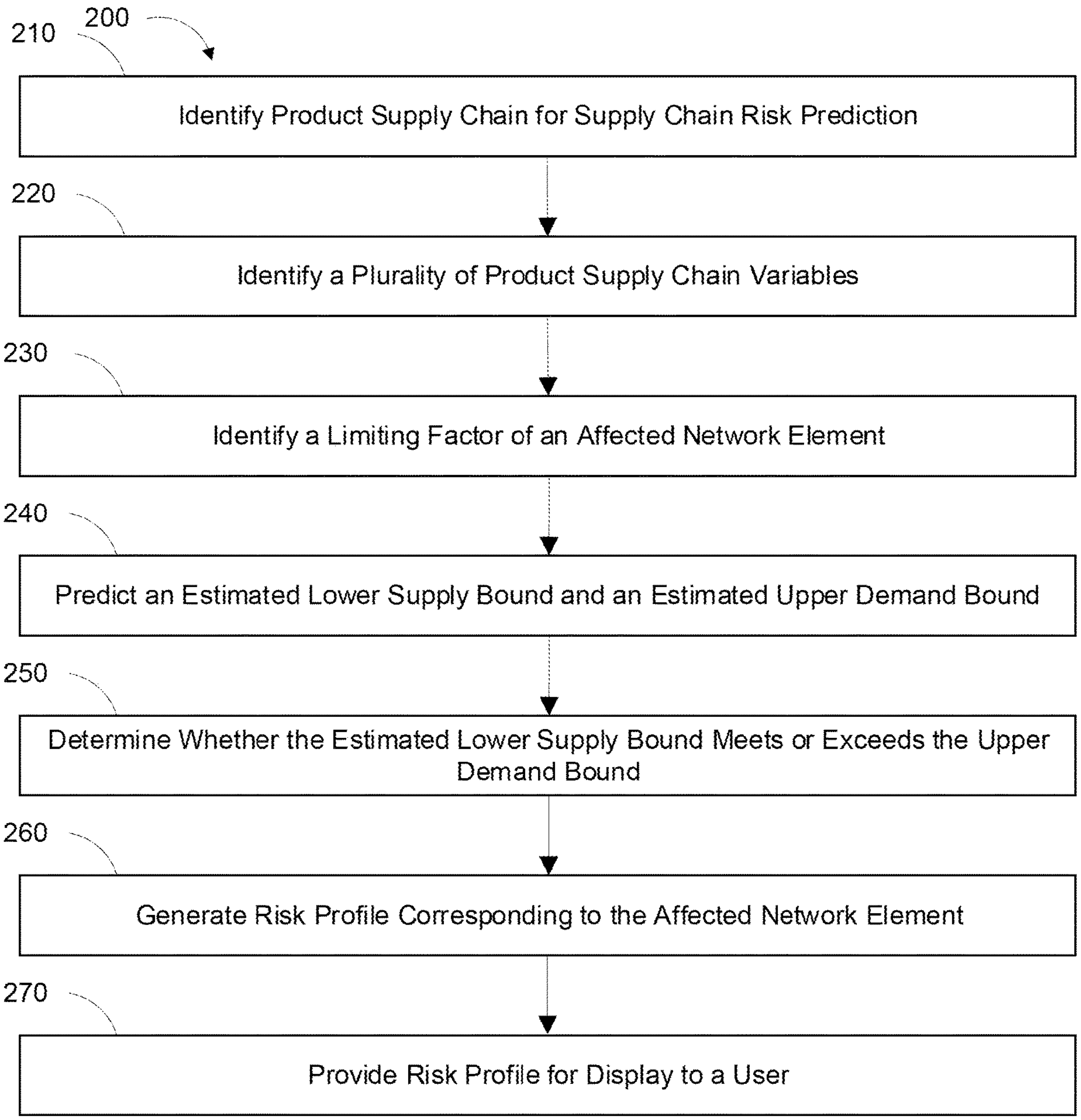
FIG. 2 depicts a process for predicting, and supply chain demand risk, according to one or more embodiments shown and described herein.

FIG. 2 depicts a process 200 for predicting supply chain risk. It is noted that while a discrete number of blocks are illustrated in a predetermined order, additional and/or fewer steps, in any order, may be included without departing from the scope of the present disclosure.

In block 210, a product supply chain for supply chain risk prediction may be identified In block 220, a plurality of supply variables for the product supply chain may be identified. The plurality of product supply chain variables may include material supply data and/or material demand data. The plurality of product supply chain variables may include network element variables that affect at least one network element of the plurality of network elements. As described herein, product supply chain variables may be values assigned to data pertaining to the supply chain. Product supply chain variables may include demand variables and supply variables. Demand variables may include data relating to demand of a product or of a material consumed, processed, manufactured, produced, transported, and/or otherwise used within the supply chain, such as, as described above, historical sales data, consumer price index data, purchase order data, SKU data, market data, production infrastructure data, material consumption data, and/or other data pertaining to demand. Supply variables may include data relating to supply of a product or of a material consumed, processed, manufactured, produced, transported, and/or otherwise used within the supply chain, such as, as described above, material data, material inventory data, purchase orders data for raw materials, transportation data, warehouse data, material consumption data, production planning data, production infrastructure data, supplier data, and/or other data pertaining to demand. To the extent any data may have bearing on both supply and demand, data may be simultaneously a supply variable and a demand variable.

Returning to FIG. 2, in block 220, identifying the plurality of product supply chain variables may thereby include identifying at least one of demand quantity predictors, material data, material inventory data, purchase orders data for raw materials, transportation data, warehouse data, material consumption data, production planning data, production infrastructure data, and/or supplier data. Identifying the plurality of product supply chain variables may include identifying historical sales data, consumer price index data, purchase order data, stock keeping unit data, market data, production infrastructure data, and/or material consumption data.

Product supply chain variables may affect a network element of a supply chain, and, in such cases, such variables may be described herein as network element variables. A network element variable may also be a supply or demand variable, as the terms are not mutually exclusive. For example, purchase order data for an end product of a supply chain may be a demand variable, but may also be a network element variable affecting network elements such as production nodes (e.g., by warranting a certain level of production) or links (e.g., by affecting total volume of product which must be transported).

Returning to FIG. 2, in block 220, the product supply chain may include a delivery stream that includes a plurality of delivery stream network elements. In such cases, the network element variables may include, for each of the plurality of delivery stream network elements, an affecting network element variable that affects the delivery stream network element. This may be because, as described above, the process 200 may include analyzing data spanning end-to-end across an entire supply chain. As such, rather than merely analyze data relating to a single node, link, or process of the supply chain, the process 200 may take into context available data affecting an entire supply chain.

Identifying product supply chain variables may not be limited to instant or contemporaneous data, but instead may include a dataset spanning a set time span (e.g., 5 years). Additionally, any single product supply chain variable may not be limited to pertaining to a single node or link within a supply chain (such as a production facility) but may pertain to some or all links and/or nodes across the entirety of the product supply chain.

In block 230, in response to determining a change to at least one of the network element variables, a limiting factor of an affected network element (i.e., a network element affected by the changed network element variable(s)) may be identified, using at least one of the network element variables, by the remote computing device 104. A limiting factor may include any data point or collection of data points of the product supply chain variables identified in block 220. Several limiting factors may be identified, or a single limiting factor may be identified, depending on the number of changed network element variables, the context of such changes, and other factors. A limiting factor can affect a single link or node of a supply chain, or a limiting factor can affect a plurality of links or nodes of a supply chain, and so an affected network element may be a single node, link, or process of the product supply chain or may comprise two or more nodes, links, and/or processes of a product supply chain. Further, there may be a plurality of limiting factors affecting any single node of a product supply chain, each limiting factor with its own relevant date or dates. As such, in block 230, a plurality of limiting factors may be identified, each limiting factor affecting one or more nodes or links within the supply chain.

The limiting factor may include a supply limiting factor. For example, a material inventory forecast indicating a future material inventory insufficient for continued production of products at a production facility would be a limiting factor for the supply of the product. Identifying supply limiting factors may include identifying a relevant date or dates at which the supply limiting factor is activated (e.g., the date material inventory reaches insufficient levels for continued production). Further, supply limiting factors can refer to the product of the supply chain or materials consumed, processed, manufactured, produced, transported, and/or otherwise used within the supply chain. As such, supply limiting factors can include factors indicating a probability or determination that a material or product at any node or link within the supply chain may reach insufficient levels to continue operation of that node or link of the supply chain.

The limiting factor may include a demand limiting factor. For example, a demand quantity predictor or the deadline of a presently unfulfilled purchase order may be a demand limiting factor of the product. Identifying demand limiting factors includes, in some embodiments, identifying a relevant date or dates at which the limiting factor is activated (e.g., the date at which a product purchase order is due). Further, demand limiting factors can, in some embodiments, refer to the product of the supply chain or materials consumed, processed, manufactured, produced, transported, and/or otherwise used within the product supply chain. As such, in those embodiments, demand limiting factors can include factors indicating potential demand levels for any material or product at any node or link within the supply chain.

In block 240, an estimated lower supply bound and an estimated upper demand bound corresponding to the affected network element may be predicted, using the limiting factor. In some embodiments, the estimated lower supply bound is associated with particular dates indicating an estimation of what the minimum supply of a material or product may be at a particular node or link or for a particular process within the product supply chain at the particular date. In some embodiments, the estimated lower supply bound may be a range of values, rather than a single discrete value. Further, in some embodiments, the estimated lower supply bound may be associated with a probability or confidence interval associated with the amount or range of amounts.

In some embodiments, the estimated upper demand bound is associated with particular dates indicating an estimation of what the maximum demand of a relevant material or product may be at a particular node or link or for a particular process within the supply chain at the particular date. The estimated upper demand bound may be a range of values, rather than a single discrete value. Further, the estimated upper demand bound may be associated with a probability or confidence interval associated with the amount or range of amounts.

Identification of limiting factors in block 230 and use of those limiting factors to predict an estimated lower supply bound and an estimated upper demand bound in block 240 may be conducted by processing data with a supply chain risk analysis algorithm such as the supply chain risk analysis model.

In block 250, a determination may be made regarding whether the estimated lower supply bound meets or exceeds the estimated upper demand bound. In embodiments, this may comprise, for each network element of the product supply chain, determining if at any point in time in a predetermined time period the estimated upper demand bound exceeds the estimated lower supply bound (indicating a potential failure point for the supply chain). This process may be repeated iteratively for each network element of the product supply chain analyzed. In embodiments, in response to determining that the estimated upper demand bound does not exceed the estimated upper demand bound, the remote computing device 104 determines that there is no supply chain risk.

In block 260, a risk profile corresponding to the affected network element may be generated. As described above, generating risk profiles can include indicating a probability and severity of a risk. In some embodiments, the risk probability may be zero. In some embodiments, a confidence interval may be associated with one or both of the minimum supply and maximum demand, and so there may still be a value associated with risk probability and risk severity. The risk profile may be output in a visualization, as described above. The risk visualization may include a risk alert that corresponds to a predetermined risk category of the supply chain. In embodiments incorporated into a digital twin of the supply chain, the predetermined categories may depend on the user and relate to particular network elements for which the user is responsible. The risk visualization may include a visualization of at least one of purchase orders data, historical data, projections of the product supply chain, a risk alert, or a risk mitigation lever.

In some embodiments, the risk profile includes information indicating at least one of a nature of the risk profile, a probability of a negative consequence of the risk profile manifesting, and/or a severity of the negative consequence of the risk profile manifesting. The risk profile may include a risk mitigation lever, as described above. The risk mitigation lever may include submitting a new purchase order, updating an unfulfilled purchase order, changing a start node of the product supply chain, changing an end node of the product supply chain, changing a delivery stream of the product supply chain, changing a third party contractor, changing materials used in the product supply chain, changing materials consumed in the product supply chain, and/or changing materials produced in the product supply chain. As described above, the risk mitigation levers may include an action or choice of actions which may reduce the probability or severity of the risk profile at a certain date or at all dates within the predetermined time period. The generation of risk mitigation levers may include an optimization process. The optimization process may, in further embodiments, be conducted by an AI or MILP algorithm or otherwise by a supply chain risk prediction algorithm. In some embodiments, an array of risk mitigation levers may be identified and simulated.

In block 270 the risk profile may be provided for display to a user. The risk profile provided to the user may be abbreviated based on factors such as a user's credentials or a user's responsible network elements, and so a single risk profile may be generated but the output of the risk profile to relevant users may change depending on the particular user to which the risk profile is output.

In embodiments where the risk profile includes risk mitigation levers, the risk profile may only include generated risk mitigation levers which reduce the probability or severity of the risk profile at least one date within the predetermined time period. In some embodiments, the number of provided risk mitigation levers may be reduced or provided risk mitigation levers may be organized according to predetermined thresholds or constraints before providing the risk profile for display.

Figure 3:
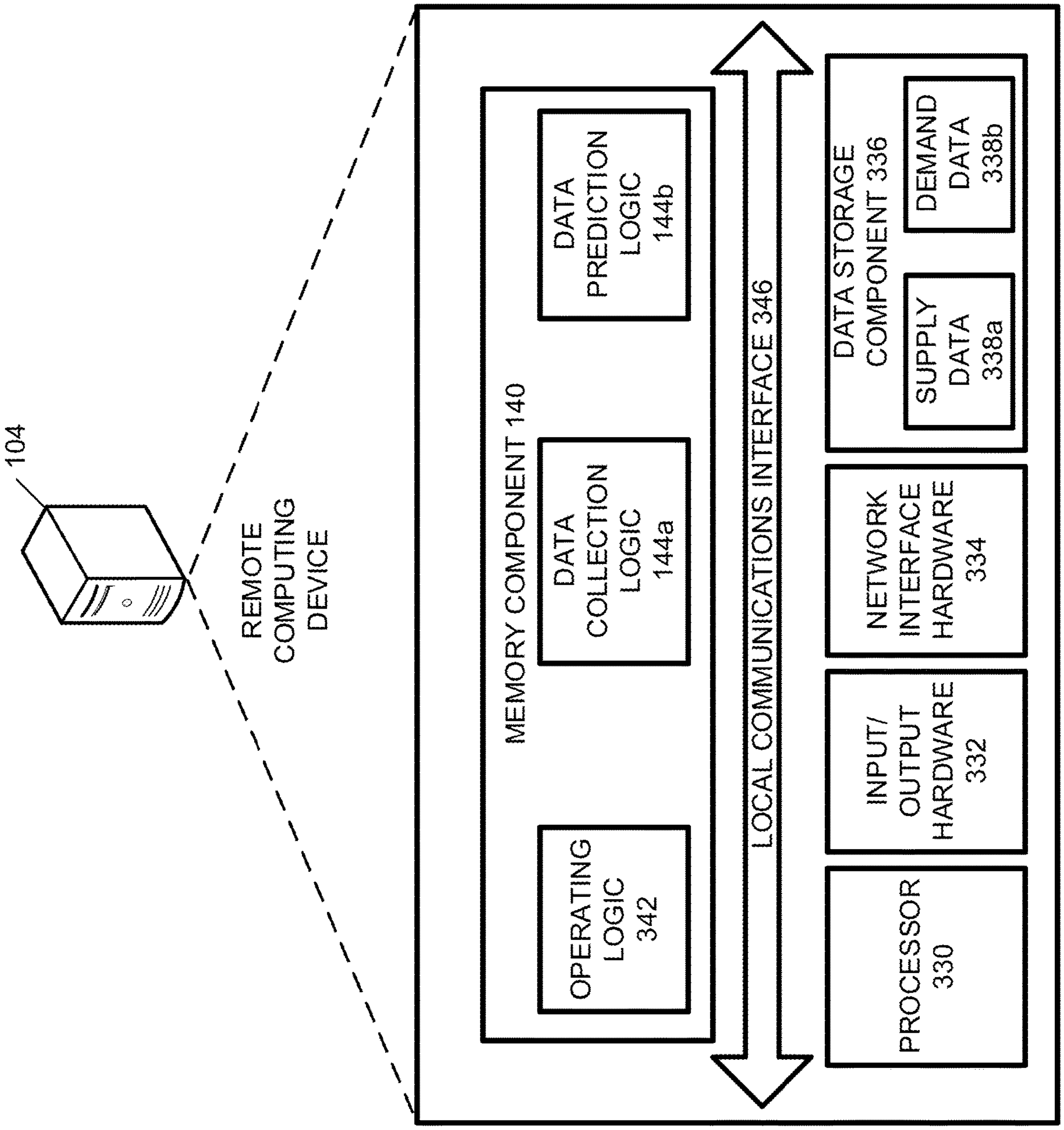
FIG. 3 depicts components of a computing device for predicting supply chain risk, according to one or more embodiments shown and described herein.

FIG. 3 depicts components of a remote computing device 104, according to embodiments described herein. The remote computing device 104 includes a processor 330, input/output hardware 332, the network interface hardware 334, a data storage component 336 (which stores supply data 338*a*, demand data 338*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 342, the data collection logic 144*a* and the data prediction logic 144*b*. The data collection logic 144*a* and the data prediction logic 144*b* may each include a plurality of different pieces of logic, each of which may be embodied as a computer program, firmware, and/or hardware, as an example. A local communications interface 346 is also included in FIG. 3 and may be implemented as a bus or other communication interface to facilitate communication among the components of the remote computing device 104.

The processor 330 may include any processing component operable to receive and execute instructions (such as from a data storage component 336 and/or the memory component 140). The network interface hardware 334 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 104 and other computing devices, such as via the internet, to provide the functionality described herein.

The operating logic 342 may include an operating system and/or other software for managing components of the remote computing device 104. As also discussed above, the data collection logic **144*a* and the data prediction logic 144*b* may reside in the memory component 140 and may be configured to cause the processor 330 to provide, facilitate, and/or collect supply data 338*a* and demand data 338*b*** and make predictions, as described above.

It should be understood that while the components in FIG. 3 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the data collection logic **144*a* and the data prediction logic 144*b* may reside on different computing devices. As an example, one or more of the functionality and/or components described herein may be provided by another computing device, such as the demand side computing device 106, supply side computing device 108, the user computing device 110**, etc.

Additionally, while the remote computing device 104 is illustrated with the data collection logic **144*a* and the data prediction logic 144*b* as separate logical components, this is also an example. In some embodiments, a single piece of logic may cause the remote computing device 104** to provide the described functionality.

It is noted that recitations herein of a component of the present disclosure being "configured" or "programmed" in a particular way, to embody a particular property, or to function in a particular manner, are structural recitations, as opposed to recitations of intended use. It is also noted that recitations herein of "at least one" component, element, etc., or "one or more" components, elements, etc. should not be used to create an inference that the alternative use of the articles "a" or "an" should be limited to a single component, element, etc.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for predicting supply chain risk. It should also be understood that these embodiments are merely exemplary and are not intended to limit the scope of this disclosure.

What is claimed is:

1. A system for hydrocarbon supply chain modification based on predicted hydrocarbon supply chain risk, the system comprising:

a computing device that includes a memory component and a processor;

a hydrocarbon supply chain network element monitoring system that includes at least one sensor for monitoring a plurality of hydrocarbon supply chain network elements, wherein the at least one sensor may be configured as a flow sensor for determining at least one of the following: an amount of hydrocarbon stored, an amount of materials consumed in hydrocarbon extraction, or an amount of hydrocarbon extracted in a given time period;

hydrocarbon supply chain modification hardware for modifying at least one of the hydrocarbon supply chain network elements;

a hydrocarbon supply chain data memory;

a hydrocarbon supply chain risk prediction output translator; and a hydrocarbon supply chain risk predictor configured to cause the system to perform at least the following:

identify a hydrocarbon supply chain for hydrocarbon supply chain risk prediction, wherein the hydrocarbon supply chain includes the plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receive, by the hydrocarbon supply chain data memory from the hydrocarbon supply chain network element monitoring system via data from the sensor, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that affect at least one hydrocarbon supply chain network element of the plurality of hydrocarbon supply chain network elements;

in response to determining a change to at least one of the hydrocarbon supply chain network element variables, identify, using at least one of the hydrocarbon supply chain network element variables, a limiting factor of an affected hydrocarbon supply chain network element;

predict, using the limiting factor, an estimated lower supply bound and an estimated upper demand bound corresponding to the affected hydrocarbon supply chain network element;

determine whether the estimated lower supply bound meets or exceeds the estimated upper demand bound;

in response to determining that the estimated upper demand bound exceeds the estimated lower supply bound, generate a risk profile corresponding to the affected hydrocarbon supply chain network element;

generate, using the risk profile, one or more hydrocarbon supply chain risk mitigation levers;

implement at least one of the hydrocarbon supply chain risk mitigation levers using the hydrocarbon supply chain risk prediction output translator, the hydrocarbon supply chain modification hardware, or both;

generating, by the computing device, a graphical user interface that displays in real time interactive visualization of supply chain risk profiles;

displaying, by the computing device, the graphical user interface comprising interactive virtual interfaces that allow a user selection to make changes to the supply chain risk profiles to predict changes in the supply of one or more products; and in response to the user selection, displaying, by the computing device, the interactive virtual interfaces enable customization of a proposed hydrocarbon supply chain risk mitigation levers and enables a user to submit a request to implement the hydrocarbon supply chain risk mitigation levers.

2. The system of claim 1, wherein:

the limiting factor includes a supply limiting factor and a demand limiting factor;

the estimated lower supply bound is calculated using the supply limiting factor; and the estimated upper demand bound is calculated using the demand limiting factor.

3. The system of claim 1, wherein the hydrocarbon supply chain risk mitigation levers include at least one of the following: submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, or used in the hydrocarbon supply chain.

4. The system of claim 1, wherein:

the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

5. The system of claim 1, wherein the logic further causes the system to provide a visualization interface that enables customization of a proposed hydrocarbon supply chain risk mitigation levers and enables a user to submit a request to implement the hydrocarbon supply chain risk mitigation levers.

6. A method for modifying a hydrocarbon supply chain based on predicted hydrocarbon supply chain risk, the method comprising:

identifying, by a hydrocarbon supply chain risk predictor, a hydrocarbon supply chain for hydrocarbon supply chain risk prediction, wherein the hydrocarbon supply chain includes a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receiving, by a hydrocarbon supply chain data memory from a hydrocarbon supply chain network monitoring system that includes at least one sensor for monitoring a plurality of hydrocarbon supply chain network elements, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that each affect at least one hydrocarbon supply chain network element of the plurality of hydrocarbon supply chain network elements, wherein the at least one sensor may be configured as a flow sensor for determining at least one of the following: an amount of hydrocarbon stored, an amount of materials consumed in hydrocarbon extraction, or an amount of hydrocarbon extracted in a given time period;

in response to determining a change to at least one of the hydrocarbon supply chain network element variables, identifying, by the hydrocarbon supply chain risk predictor and using at least one of the hydrocarbon supply chain network element variables, a first limiting factor of an affected hydrocarbon supply chain network element;

predicting, by the hydrocarbon supply chain risk predictor and using the first limiting factor, a first estimated lower supply bound and a first estimated upper demand bound corresponding to the affected hydrocarbon supply chain network element;

determining, by the hydrocarbon supply chain risk predictor, whether the first estimated lower supply bound meets or exceeds the first estimated upper demand bound;

in response to determining that the first estimated upper demand bound exceeds the estimated lower supply bound, generating, by the hydrocarbon supply chain risk predictor, a risk profile corresponding to the affected hydrocarbon supply chain network element;

generating, by the hydrocarbon supply chain risk predictor and using the risk profile, one or more hydrocarbon supply chain risk mitigation levers;

implementing at least one of the hydrocarbon supply chain risk mitigation levers using a hydrocarbon supply chain risk prediction output translator, hydrocarbon supply chain modification hardware for modifying at least one of the hydrocarbon supply chain network elements, or both;

generating, by a computing device, a graphical user interface that displays in real time interactive visualization of supply chain risk profiles;

displaying, by the computing device, the graphical user interface comprising interactive virtual interfaces that allow a user selection to make changes to the supply chain risk profiles to predict changes in the supply of one or more products; and in response to the user selection, displaying, by the computing device, the interactive virtual interfaces enable customization of a proposed hydrocarbon supply chain risk mitigation levers and enables a user to submit a request to implement the hydrocarbon supply chain risk mitigation levers.

7. The method of claim 6, wherein:

the first limiting factor includes a supply limiting factor and a demand limiting factor;

the first estimated lower supply bound is calculated using the supply limiting factor;

and the first estimated upper demand bound is calculated using the demand limiting factor.

8. The method of claim 7, wherein receiving the plurality of hydrocarbon supply chain variables includes receiving at least one of the following supply variables: material data, material inventory data, purchase orders data for raw materials, transportation data, warehouse data, material consumption data, production planning data, production infrastructure data, or supplier data and wherein receiving the plurality of hydrocarbon supply chain variables includes receiving at least one of the following demand variables: historical sales data, consumer price index data, purchase order data, stock keeping unit data, market data, production infrastructure data, or material consumption data.

9. The method of claim 6, further comprising:

identifying, by the hydrocarbon supply chain risk predictor and using at least one of the hydrocarbon supply chain network element variables, a second limiting factor of the affected hydrocarbon supply chain network element;

predicting, by the hydrocarbon supply chain risk predictor and using the second limiting factor, a second estimated lower supply bound and a second estimated upper demand bound corresponding to the affected hydrocarbon supply chain network element;

determining, by the hydrocarbon supply chain risk predictor, whether the second estimated lower supply bound meets or exceeds the second estimated upper demand bound;

and in response to determining that the second estimated upper demand bound does not exceed the second estimated lower supply bound, generating, by the hydrocarbon supply chain risk predictor, the risk profile corresponding to the affected network element.

10. The method of claim 9, wherein the hydrocarbon supply chain risk mitigation levers include at least one of the following: submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, or used in the hydrocarbon supply chain.

11. The method of claim 6, wherein:

the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

12. The method of claim 6, further comprising, in response to determining that the first estimated upper demand bound does not exceed the first estimated lower supply bound, determining that there is no supply chain risk.

13. The method of claim 12, wherein the risk visualization includes a risk alert that corresponds to a predetermined risk category of the hydrocarbon supply chain.

14. The method of claim 12, wherein the risk visualization includes at least one of the following:

purchase orders data;

historical data;

projections of the hydrocarbon supply chain;

a risk alert; and a risk mitigation lever.

15. The method of claim 6, wherein generating the risk profile includes generating a risk visualization.

16. The method of claim 6, wherein the risk profile includes information indicating at least one of the following: a nature of the risk profile, a probability of a negative consequence of the risk profile manifesting, or a severity of the negative consequence of the risk profile manifesting.

17. A non-transitory computer-readable medium that stores logic that, when executed by a hydrocarbon supply chain risk predictor, causes the hydrocarbon supply chain risk predictor to perform at least the following:

identify a hydrocarbon supply chain for hydrocarbon supply chain risk prediction, wherein the hydrocarbon supply chain includes a plurality of hydrocarbon supply chain network elements, each of the plurality of hydrocarbon supply chain network elements including at least one of the following: a hydrocarbon extraction site, a hydrocarbon refinement facility, a hydrocarbon transportation system, or a hydrocarbon refinement process;

receive, by a hydrocarbon supply chain data memory from a hydrocarbon supply chain network element monitoring system that includes at least one sensor for monitoring a plurality of hydrocarbon supply chain network elements, a plurality of hydrocarbon supply chain variables for the hydrocarbon supply chain, wherein each of the plurality of hydrocarbon supply chain variables includes data identifying at least one of the following: material supply or material demand, wherein the plurality of hydrocarbon supply chain variables includes hydrocarbon supply chain network element variables that affect at least one hydrocarbon supply chain network element of the plurality of hydrocarbon supply chain network elements, wherein the at least one sensor may be configured as a flow sensor for determining at least one of the following: an amount of hydrocarbon stored, an amount of materials consumed in hydrocarbon extraction, or an amount of hydrocarbon extracted in a given time period;

in response to determining a change to at least one of the hydrocarbon supply chain network element variables, identify, using at least one of the hydrocarbon supply chain network element variables, a limiting factor of an affected hydrocarbon supply chain network element;

predict, using the limiting factor, an estimated lower supply bound and an estimated upper demand bound corresponding to the affected hydrocarbon supply chain network element;

determine whether the estimated lower supply bound meets or exceeds the estimated upper demand bound;

in response to determining that the estimated upper demand bound exceeds the estimated lower supply bound, generate a risk profile corresponding to the affected hydrocarbon supply chain network element;

generate, using the risk profile, one or more hydrocarbon supply chain risk mitigation levers;

implement at least one of the hydrocarbon supply chain risk mitigation levers using a hydrocarbon supply chain risk output translator, hydrocarbon supply chain modification hardware for modifying at least one of the hydrocarbon supply chain network elements, or both;

generate a graphical user interface that displays in real time interactive visualization of supply chain risk profiles;

display the graphical user interface comprising interactive virtual interfaces that allow a user selection to make changes to the supply chain risk profiles to predict changes in the supply of one or more products; and in response to the user selection, display the interactive virtual interfaces enable customization of a proposed hydrocarbon supply chain risk mitigation levers and enables a user to submit a request to implement the hydrocarbon supply chain risk mitigation levers.

18. The non-transitory computer-readable medium of claim 17, wherein:

the limiting factor includes a supply limiting factor and a demand limiting factor;

the estimated lower supply bound is calculated using the supply limiting factor; and the estimated upper demand bound is calculated using the demand limiting factor.

19. The non-transitory computer-readable medium of claim 17, wherein the hydrocarbon supply chain risk mitigation levers include at least one of the following:

submitting a new purchase order, updating an unfulfilled purchase order, changing a start node of the hydrocarbon supply chain, changing an end node of the hydrocarbon supply chain, changing a delivery stream of the hydrocarbon supply chain, or changing materials consumed, processed, manufactured, produced, transported, or used in the hydrocarbon supply chain.

20. The non-transitory computer-readable medium of claim 17, wherein:

the hydrocarbon supply chain includes a delivery stream comprising a plurality of delivery stream network elements; and the hydrocarbon supply chain network element variables include, for each of the plurality of delivery stream network elements, an affecting network element variable that affects the delivery stream network element.

* * * * *